(12) United States Patent
Finell et al.

(10) Patent No.: US 11,084,628 B2
(45) Date of Patent: Aug. 10, 2021

(54) FLEXIBLE CONTAINER WITH SPOUTS AND CLOSURE

(71) Applicant: Rebecca Finell, Austin, TX (US)

(72) Inventors: Rebecca M. Finell, Austin, TX (US); Joshua J. Nelson, Mesa, AZ (US)

(73) Assignee: ZIP TOP LLC, Austin, TX (US)

( * ) Notice: Subject to any disclaimer, the term of this patent is extended or adjusted under 35 U.S.C. 154(b) by 0 days.

(21) Appl. No.: 16/154,134

(22) Filed: Oct. 8, 2018

(65) Prior Publication Data

US 2019/0270546 A1    Sep. 5, 2019

Related U.S. Application Data

(63) Continuation-in-part of application No. 15/910,757, filed on Mar. 2, 2018.

(51) Int. Cl.
*B65D 33/25* (2006.01)
*A47G 19/02* (2006.01)
(Continued)

(52) U.S. Cl.
CPC ......... *B65D 33/2508* (2013.01); *A47G 19/02* (2013.01); *A47G 19/2205* (2013.01);
(Continued)

(58) Field of Classification Search
CPC ............. B65D 33/25; B65D 33/2508; B65D 33/2516; B65D 33/2525; B65D 33/2533;
(Continued)

(56) References Cited

U.S. PATENT DOCUMENTS

| | | | |
|---|---|---|---|
| 1,002,346 A | 9/1911 | Weeks | 229/400 |
| 1,769,186 A | 7/1930 | Morries | 607/110 |

(Continued)

FOREIGN PATENT DOCUMENTS

| | | | |
|---|---|---|---|
| EP | 0616948 A1 | 9/1994 | B65D 1/00 |
| JP | D140735 S | 11/2010 | |

(Continued)

OTHER PUBLICATIONS

Chinese Office Action, Application No. 201830098713.5, 1 page, dated Jul. 5, 2018.
(Continued)

*Primary Examiner* — Jes F Pascua
*Assistant Examiner* — Nina K Attel
(74) *Attorney, Agent, or Firm* — Slayden Grubert Beard PLLC

(57) ABSTRACT

A container comprising: a base and freestanding sides extending from the base to define a mouth opposite the base, wherein the mouth has first and second spouts opposite each other and first and second interior sides opposite each other between the first and second spouts; a first zipper member extending from the first interior side of the mouth from the first spout to the second spout; a second zipper member extending from the second interior side of the mouth from the first spout to the second spout, wherein the mouth is deformable between open and closed configurations and the first and second zipper members are disengagable when the mouth is open and engagable when the mouth is closed, wherein the base, sides, and zipper members are a unitary whole container without assembled parts, wherein the container comprises silicone.

8 Claims, 18 Drawing Sheets

(51) Int. Cl.
*A47G 19/22* (2006.01)
*B65D 33/00* (2006.01)

(52) U.S. Cl.
CPC ............. *B65D 33/00* (2013.01); *B65D 33/25* (2013.01); *B65D 33/2541* (2013.01); *A47G 2400/10* (2013.01)

(58) Field of Classification Search
CPC .............. B65D 33/2541; B65D 33/255; B65D 33/2558; B65D 33/2566; B65D 33/2575; B65D 33/2583; B65D 33/2591; B65D 33/2584; B65D 33/2585; B65D 33/2586; B65D 33/25865; B65D 33/2587; B65D 33/2588; B65D 33/2589; B65D 33/259
USPC ................. 383/68, 69, 61.1, 63–65
See application file for complete search history.

(56) References Cited

U.S. PATENT DOCUMENTS

| | | | |
|---|---|---|---|
| 1,879,602 A | 9/1932 | Copeman | 249/130 |
| 2,012,113 A | 8/1935 | Thompson | 215/363 |
| 2,048,012 A | 7/1936 | Leavens | 99/584 |
| 2,117,738 A | 5/1938 | Otto | 220/266 |
| 2,165,277 A | 7/1939 | Herman | 229/405 |
| 2,542,294 A | 2/1951 | Smith | 383/40 |
| 2,563,933 A | 8/1951 | Hipps et al. | 383/86 |
| 2,589,967 A | 3/1952 | Sawyer | 215/372 |
| 2,595,328 A | 5/1952 | Bowen | 607/114 |
| 2,800,269 A | 7/1957 | Smith | 383/38 |
| 2,861,716 A | 11/1958 | Kramer | 215/228 |
| 2,961,850 A | 11/1960 | Tupper | 249/126 |
| 2,966,041 A | 12/1960 | Zearfoss, Jr. et al. | 62/60 |
| 3,052,399 A | 9/1962 | Brown | 383/204 |
| 3,306,567 A | 2/1967 | Frei, Sr. | 249/53 R |
| 3,354,601 A | 11/1967 | Schneider | 493/196 |
| 3,799,914 A | 3/1974 | Schmit et al. | 426/85 |
| 3,804,077 A | 4/1974 | Williams | 126/263.1 |
| 3,844,525 A | 10/1974 | Parmett | 249/127 |
| 3,885,403 A | 5/1975 | Spencer | 62/530 |
| 3,893,834 A | 7/1975 | Armstrong | 62/4 |
| 4,055,188 A | 10/1977 | Pelton | 607/112 |
| 4,527,566 A | 7/1985 | Abare | 607/112 |
| 4,530,220 A | 7/1985 | Nambu et al. | 62/530 |
| 4,587,810 A | 5/1986 | Fletcher | 62/3.63 |
| D285,515 S | 9/1986 | Papciak | D24/119 |
| 4,655,862 A * | 4/1987 | Christoff | B29C 65/20 156/244.11 |
| 4,676,247 A | 6/1987 | Van Cleve | 607/112 |
| D291,659 S | 9/1987 | Powell | D7/507 |
| 4,783,042 A | 11/1988 | Folkmar | 249/127 |
| 4,813,646 A | 3/1989 | Fujio | 249/55 |
| 4,883,251 A | 11/1989 | Manas | 249/53 R |
| 5,046,860 A | 9/1991 | Brennan | 383/38 |
| 5,148,804 A | 9/1992 | Hill et al. | 607/108 |
| 5,215,080 A | 6/1993 | Thomas et al. | 607/112 |
| 5,237,838 A | 8/1993 | Merritt-munson | 62/457.2 |
| 5,350,045 A | 9/1994 | Robertson | 190/110 |
| 5,499,763 A | 3/1996 | Demars | 229/114 |
| D374,204 S | 10/1996 | Weder | D11/143 |
| 5,689,866 A | 11/1997 | Kasai et al. | 24/585.12 |
| 5,692,837 A | 12/1997 | Beer | 373/210.1 |
| 5,758,473 A | 6/1998 | Patelli | 53/412 |
| 5,782,562 A | 7/1998 | Anspacher | 383/3 |
| D399,708 S | 10/1998 | Grissom | D07/629 |
| D401,141 S | 11/1998 | Carroll et al. | D09/608 |
| D407,970 S | 4/1999 | Planchard | D9/703 |
| 5,906,438 A | 5/1999 | Laudenberg | 383/63 |
| D418,368 S | 1/2000 | Solland | D7/510 |
| D418,747 S | 1/2000 | Sagel | D9/707 |
| D419,867 S | 2/2000 | Hager et al. | D09/608 |
| 6,050,432 A | 4/2000 | Koehnke | 215/11.3 |
| D423,877 S | 5/2000 | Kerr | D07/509 |
| 6,076,967 A | 6/2000 | Beaudette | 383/41 |
| 6,164,488 A | 12/2000 | Solland | 220/717 |
| 6,164,822 A | 12/2000 | Beer | 383/38 |
| 6,164,826 A | 12/2000 | Petkovsek | 383/210.1 |
| 6,176,420 B1 | 1/2001 | Sarson | 229/128 |
| 6,197,359 B1 | 3/2001 | Llorente Hompanera | 426/523 |
| 6,245,367 B1 | 6/2001 | Galomb | 426/115 |
| D445,223 S | 7/2001 | Butler | D30/145 |
| 6,325,543 B1 | 12/2001 | Ausnit | 383/210.1 |
| D456,211 S | 4/2002 | Price | D7/509 |
| D457,318 S | 5/2002 | Borland et al. | D03/303 |
| D464,258 S | 10/2002 | Edwards | D09/708 |
| 6,470,705 B2 | 10/2002 | Bride-flynn | 62/530 |
| D470,361 S | 2/2003 | Trombly | D7/509 |
| D470,755 S | 2/2003 | Espinel | D9/707 |
| D482,614 S | 11/2003 | Countee, Jr. | D09/430 |
| D495,209 S | 8/2004 | Tranfaglia | D7/509 |
| D502,364 S | 3/2005 | Chan | D7/509 |
| 6,945,988 B1 | 9/2005 | Jones | 607/108 |
| 7,029,178 B2 | 4/2006 | Gzybowski | 383/64 |
| D522,183 S | 5/2006 | Wylie | D30/118 |
| 7,065,983 B2 | 6/2006 | Trinh et al. | 62/530 |
| 7,160,029 B2 | 1/2007 | Bein et al. | 383/67 |
| D541,171 S | 4/2007 | Delmotte et al. | D09/709 |
| 7,197,893 B2 | 4/2007 | Trinh et al. | 62/530 |
| 7,204,641 B2 | 4/2007 | Stolmeier | 383/64 |
| D553,442 S | 10/2007 | Bodum | D7/509 |
| D554,432 S | 11/2007 | Roth et al. | D07/516 |
| D567,592 S | 4/2008 | Fite, IV et al. | D07/568 |
| D580,779 S | 11/2008 | Hartwell et al. | D09/705 |
| D582,790 S | 12/2008 | Friebe | D9/707 |
| D586,232 S | 2/2009 | Friebe | D9/707 |
| 7,524,111 B1 | 4/2009 | Williams | 220/23.87 |
| D600,072 S | 9/2009 | Hayes | D7/509 |
| D605,895 S | 12/2009 | Abbott | D7/509 |
| D609,581 S | 2/2010 | Doyal | D09/703 |
| D616,760 S | 6/2010 | Deuerer | D09/611 |
| D618,302 S | 6/2010 | Williams | D23/209 |
| D622,109 S | 8/2010 | Hull et al. | D7/630 |
| D627,608 S | 11/2010 | Markum | D07/672 |
| 8,070,359 B2 | 12/2011 | Taheri | 383/66 |
| D657,950 S | 4/2012 | Herman | D3/202 |
| D660,446 S | 5/2012 | Baltazar | D24/208 |
| 8,182,407 B2 | 5/2012 | Yeager | 493/213 |
| 8,209,995 B2 | 7/2012 | Kieling et al. | 62/457.1 |
| 8,220,651 B2 | 7/2012 | Norcom | 220/1.6 |
| D668,118 S | 10/2012 | Hayes et al. | D07/602 |
| D672,202 S | 12/2012 | Craft et al. | D07/586 |
| D683,190 S | 5/2013 | Shields | D07/544 |
| D683,592 S | 6/2013 | Shields | D07/544 |
| D684,867 S | 6/2013 | English | D9/707 |
| D684,868 S | 6/2013 | Kessler | D9/707 |
| D686,508 S | 7/2013 | Kling | D9/703 |
| 8,479,972 B2 | 7/2013 | Craft et al. | 229/101 |
| D689,370 S | 9/2013 | Bower | D9/707 |
| 8,523,440 B2 | 9/2013 | Walker et al. | 383/202 |
| D690,995 S | 10/2013 | Franco | D07/516 |
| 8,690,428 B2 | 4/2014 | Kruse et al. | 383/5 |
| 8,696,797 B2 | 4/2014 | Steele | 95/172 |
| D705,654 S | 5/2014 | Wurth et al. | D09/451 |
| 8,864,015 B2 | 10/2014 | Lu | 229/128 |
| D722,805 S | 2/2015 | Banos | D07/301 |
| D736,099 S | 8/2015 | Deuerer | D09/707 |
| D739,727 S | 9/2015 | Olson | D9/436 |
| 9,144,278 B2 | 9/2015 | Morrow | |
| D750,334 S | 2/2016 | Comstock | D32/30 |
| D755,017 S | 5/2016 | Piechocinski | D07/584 |
| 9,371,153 B1 | 6/2016 | Nouri et al. | |
| D770,916 S | 11/2016 | Nouri et al. | D09/709 |
| D772,493 S | 11/2016 | Wu | D30/129 |
| D772,723 S | 11/2016 | Murray | D9/707 |
| D782,450 S | 3/2017 | Jones | D14/240 |
| D784,157 S | 4/2017 | Ross | D09/705 |
| D791,609 S | 7/2017 | Rotman | D9/611 |
| 9,737,161 B1 | 8/2017 | Li | A47G 19/22 |
| 9,751,655 B2 | 9/2017 | Herman | |
| D804,959 S | 12/2017 | Anda | D9/705 |
| D809,875 S | 2/2018 | Delgado Carmona | D7/628 |
| D809,876 S | 2/2018 | Delgado Carmona | D7/628 |
| D811,796 S | 3/2018 | Joseph | D7/325 |

(56) References Cited

U.S. PATENT DOCUMENTS

| | | |
|---|---|---|
| D812,487 S | 3/2018 | Soegyanto ............... D9/702 |
| D813,684 S | 3/2018 | Williams, Jr. et al. ........ D9/703 |
| D815,365 S | 4/2018 | Scariot et al. .............. D30/118 |
| D815,544 S | 4/2018 | Soegyanto ............... D9/702 |
| D817,109 S | 5/2018 | Kilicarslan ............... D7/611 |
| D826,063 S | 8/2018 | Kwon et al. ............... D9/643 |
| D831,432 S | 10/2018 | Lv ........................... D7/606 |
| D851,853 S | 6/2019 | Khan ........................ D99/5 |
| D854,325 S | 7/2019 | Myerson ................... D3/304 |
| D856,086 S | 8/2019 | Goulet ....................... D7/519 |
| D858,200 S | 9/2019 | Wang ......................... D7/516 |
| D860,001 S | 9/2019 | Sahatjian ................... D9/707 |
| 10,407,217 B1 | 9/2019 | Nouri et al. |
| 10,421,584 B2 | 9/2019 | Ross ..................... B65D 33/08 |
| D874,876 S | 2/2020 | Finell et al. ................ D7/602 |
| D876,172 S | 2/2020 | Finell et al. ................ D7/602 |
| 2003/0066870 A1 | 4/2003 | Stewart .................. 229/125.09 |
| 2004/0004010 A1 | 1/2004 | Versluys ..................... 206/219 |
| 2004/0146224 A1 | 7/2004 | Piotrowski et al. ........... 383/64 |
| 2004/0211879 A1 | 10/2004 | Stalnecker et al. ........... 249/121 |
| 2004/0244413 A1 | 12/2004 | Trinh et al. .................. 62/530 |
| 2005/0194386 A1 | 9/2005 | Shai ............................ 220/287 |
| 2006/0171609 A1 | 8/2006 | Turvey et al. ............... 383/63 |
| 2006/0191929 A1 | 8/2006 | Berg, Jr. et al. .............. 220/6 |
| 2006/0191985 A1 | 8/2006 | Norcom ................... 229/117.05 |
| 2006/0193541 A1 | 8/2006 | Norcom ....................... 383/200 |
| 2007/0130733 A1 | 6/2007 | Kasai ........................ 24/585.12 |
| 2007/0164192 A1 | 7/2007 | Holden et al. ................ 249/98 |
| 2007/0175787 A1 | 8/2007 | Lown et al. ................ 206/427 |
| 2008/0050053 A1 | 2/2008 | Szczesuil et al. ............. 383/66 |
| 2008/0063318 A1 | 3/2008 | Gattino ....................... 383/21 |
| 2008/0087268 A1 | 4/2008 | Burton ....................... 126/9 R |
| 2008/0089618 A1 | 4/2008 | Blythe ........................ 383/25 |
| 2008/0277310 A1 | 11/2008 | Chacon ....................... 206/568 |
| 2009/0110335 A1 | 4/2009 | Leboeuf ...................... 383/63 |
| 2009/0136161 A1 | 5/2009 | Hickey ....................... 383/63 |
| 2009/0279810 A1 | 11/2009 | Nobles ....................... 383/66 |
| 2010/0012531 A1 | 1/2010 | Steele ........................ 206/216 |
| 2010/0072224 A1 | 3/2010 | Ha ............................. 222/107 |
| 2010/0159083 A1 | 6/2010 | Peplinski et al. ............. 426/113 |
| 2010/0159096 A1 | 6/2010 | Sam ............................ 426/104 |
| 2010/0300919 A1 | 12/2010 | Alipour .................... 206/524.8 |
| 2010/0314434 A1 | 12/2010 | Herman ....................... 229/107 |
| 2011/0017812 A1 | 1/2011 | Belko et al. ............. 229/117.27 |
| 2011/0017814 A1 | 1/2011 | Belko et al. ............... 229/124 |
| 2011/0132910 A1 | 6/2011 | Willat et al. ............. 220/495.03 |
| 2011/0203944 A1 | 8/2011 | Singer ....................... 206/204 |
| 2011/0297680 A1 | 12/2011 | Howell et al. .............. 220/266 |
| 2012/0060449 A1 | 3/2012 | Howell et al. ............... 53/456 |
| 2012/0187182 A1 | 7/2012 | Howell et al. ............... 229/102 |
| 2012/0269469 A1 | 10/2012 | Long et al. ............... 383/210.1 |
| 2013/0084028 A1 | 4/2013 | Cross .......................... 383/33 |
| 2013/0105352 A1 | 5/2013 | Munguia ................... 206/524.6 |
| 2013/0277367 A1 | 10/2013 | Kozarsky et al. ............ 220/315 |
| 2014/0042217 A1 | 2/2014 | Houck ........................ 229/404 |
| 2014/0212075 A1 | 7/2014 | Cross .......................... 383/64 |
| 2014/0226921 A1 | 8/2014 | Albers ...................... 383/86.2 |
| 2014/0245698 A1 | 9/2014 | Steele ......................... 53/410 |
| 2014/0270579 A1 | 9/2014 | Nouri ......................... 383/63 |
| 2015/0202832 A1 | 7/2015 | Denis et al. ................. 383/63 |
| 2015/0203250 A1 | 7/2015 | Denis et al. ................. 383/63 |
| 2016/0137374 A1 | 5/2016 | Brosch et al. ............... 383/104 |
| 2016/0145030 A1 | 5/2016 | Malligan et al. ............. 426/120 |
| 2017/0036822 A1 | 2/2017 | Sam ............................ 383/38 |
| 2018/0148228 A1 | 5/2018 | Bray |
| 2018/0251267 A1 | 9/2018 | Finell ................ B65D 33/2508 |
| 2018/0370109 A1 | 12/2018 | Shaw |
| 2019/0270546 A1 | 9/2019 | Finell |

FOREIGN PATENT DOCUMENTS

| | | | |
|---|---|---|---|
| JP | D1454613 S | 11/2012 | |
| JP | 1481231 S | 10/2013 | |
| JP | 1611864 S | 8/2018 | |
| JP | 1655101 S | 3/2020 | |
| JP | 1661295 S | 6/2020 | |
| TW | M515388 | 1/2016 | ............... A61J 1/05 |
| WO | 98/12488 A1 | 3/1998 | ............. B65D 33/25 |
| WO | 2016/140746 A1 | 9/2016 | ............. G01F 19/00 |

OTHER PUBLICATIONS

Chinese Office Action, Application No. 201830099279.2, 1 page, dated Jul. 9, 2018.

Chinese Office Action, Application No. 201830098714.X, 1 pages, dated Jul. 11, 2018.

Chinese Office Action, Application No. 201830099010.4, 1 page, dated Jul. 11, 2018.

Taiwan Office Action, Application No. 107301545, 6 pages, dated Sep. 12, 2018.

Taiwan Office Action, Application No. 107301546, 5 pages, dated Sep. 12, 2018.

Taiwan Office Action, Taiwan Design Application No. 107301543, 4 pages, dated Dec. 18, 2018.

U.S. Non-Final Office Action, U.S. Appl. No. 15/910,757, 18 pages, dated Jun. 14, 2019.

Partial European Search Report, Application No. 18159842.6, 9 pages, dated Jun. 29, 2018.

Extended European Search Report and Written Opinion, Application No. 18159842.6, 9 pages, dated Oct. 19, 2018.

U.S. Non-Final Office Action, U.S. Appl. No. 29/618,115, 27 pages, dated Nov. 27, 2019.

U.S. Non-Final Office Action, U.S. Appl. No. 29/618,138, 27 pages, dated Nov. 29, 2019.

U.S. Non-Final Office Action, U.S. Appl. No. 29/618,099, 27 pages, dated Nov. 29, 2019.

U.S. Notice of Allowance, U.S. Appl. No. 29/699,278, 19 pages, dated Dec. 4, 2019.

U.S. Notice of Allowance, U.S. Appl. No. 29/699,301, 19 pages, dated Dec. 4, 2019.

U.S. Notice of Allowance, U.S. Appl. No. 29/699,897, 18 pages, dated Dec. 4, 2019.

U.S. Notice of Allowance, U.S. Appl. No. 29/699,904, 19 pages, dated Dec. 4, 2019.

U.S. Non-Final Office Action, U.S. Appl. No. 15/910,757, 21 pages, dated Jan. 8, 2020.

U.S. Non-Final Office Action, U.S. Appl. No. 15/910,757, 21 pages, dated Oct. 2, 2018.

U.S. Final Office Action, U.S. Appl. No. 15/910,757, 17 pages, dated Feb. 21, 2019.

U.S. Final Office Action, U.S. Appl. No. 15/910,757, 22 pages, dated Sep. 18, 2019.

U.S. Non-Final Office Action, U.S. Appl. No. 29/699,634, 14 pages, dated Oct. 21, 2019.

U.S. Non-Final Office Action, U.S. Appl. No. 29/699,650, 14 pages, dated Oct. 21, 2019.

U.S. Non-Final Office Action, U.S. Appl. No. 29/699,656, 14 pages, dated Oct. 21, 2019.

U.S. Advisory Action, U.S. Appl. No. 15/910,757, 3 pages, dated Oct. 28, 2019.

U.S. Notice of Allowance, U.S. Appl. No. 29/699,611, 16 pages, dated Oct. 30, 2019.

U.S. Non-Final Office Action, U.S. Appl. No. 16/296,416, 43 pages, dated Mar. 13, 2020.

International Search Report and Written Opinion, Application No. PCT/US2019/054935, 11 pages, dated Feb. 4, 2020.

Taiwan Office Action, Application No. 107301546, 30 pages, dated Feb. 10, 2020.

Taiwan Office Action, Application No. 107301545, 20 pages, dated Feb. 10, 2020.

International Search Report and Written Opinion, Application No. PCT/US2020/017893, 12 pages, dated May 20, 2020.

Japanese Office Action, Application No. 2020001090, 9 pages, dated Jun. 15, 2020.

Japanese Office Action, Application No. 2020001093, 9 pages, dated Jun. 15, 2020.

(56) References Cited

OTHER PUBLICATIONS

Japanese Office Action, Application No. 2020001101, 8 pages, dated Jun. 15, 2020.
Japanese Office Action, Application No. 2020001087, 8 pages, dated Jun. 15, 2020.
Japanese Office Action, Application No. 2020001088, 8 pages, dated Jun. 15, 2020.
Japanese Office Action, Application No. 2020001089, 9 pages, dated Jun. 15, 2020.
U.S. Final Office Action, U.S. Appl. No. 15/910,757, 28 pages, dated Jul. 8, 2020.
U.S. Final Office Action, U.S. Appl. No. 16/296,416, 19 pages, dated Jul. 16, 2020.
U.S. Non-Final Office Action, U.S. Appl. No. 16/296,416, 24 pages, dated Feb. 23, 2021.
U.S. Advisory Action, U.S. Appl. No. 15/910,757, 6 pages, dated Oct. 15, 2020.

* cited by examiner

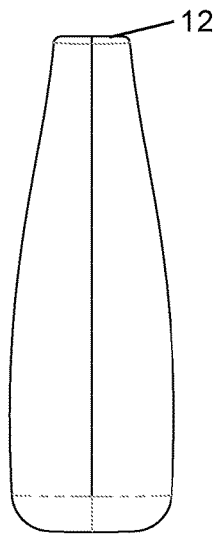
FIG. 1H
FIG. 1I
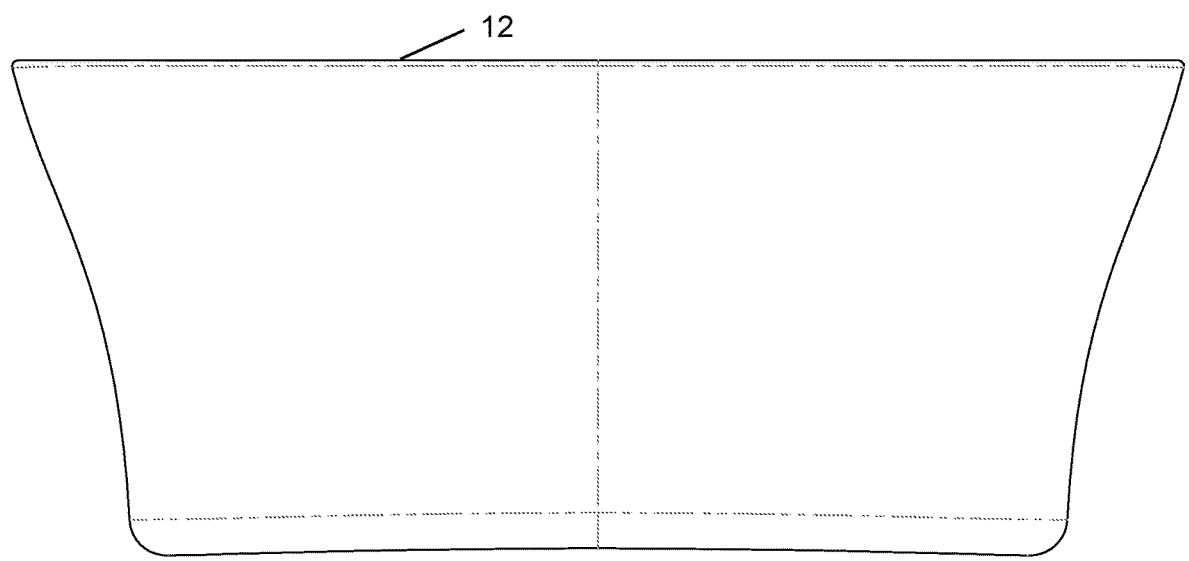
FIG. 1J
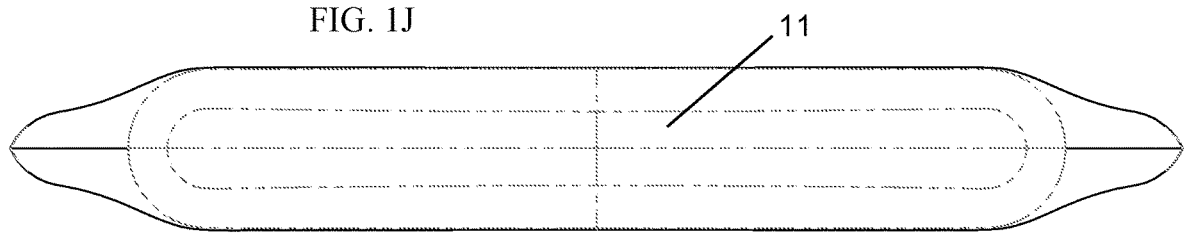

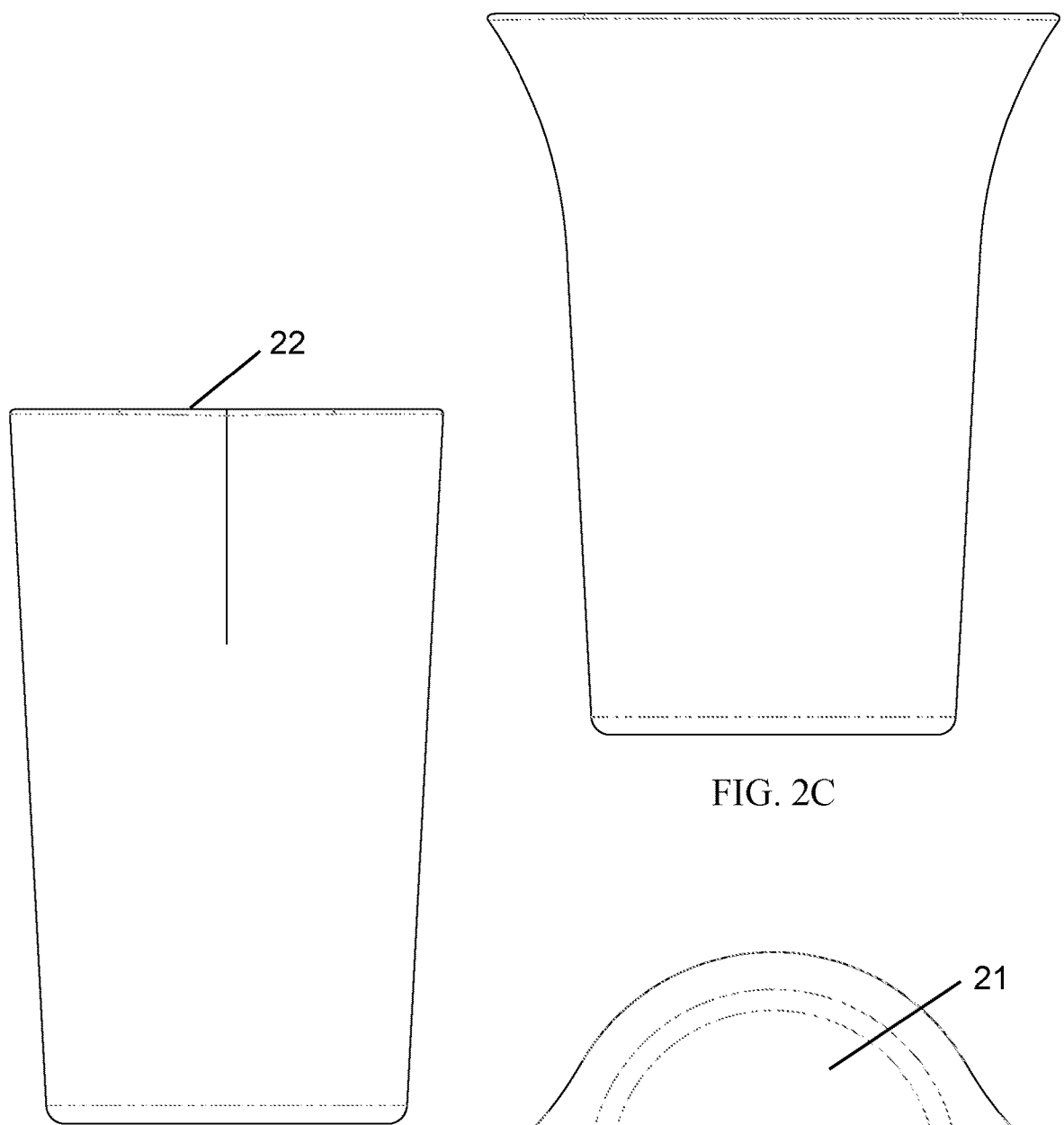
FIG. 2C
FIG. 2D
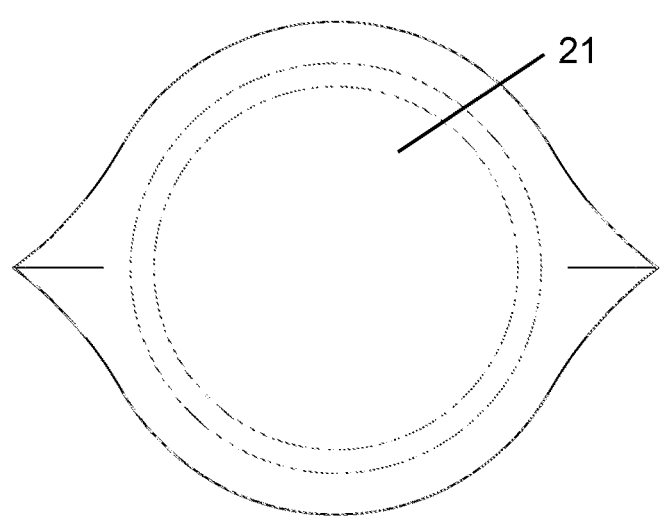
FIG. 2E

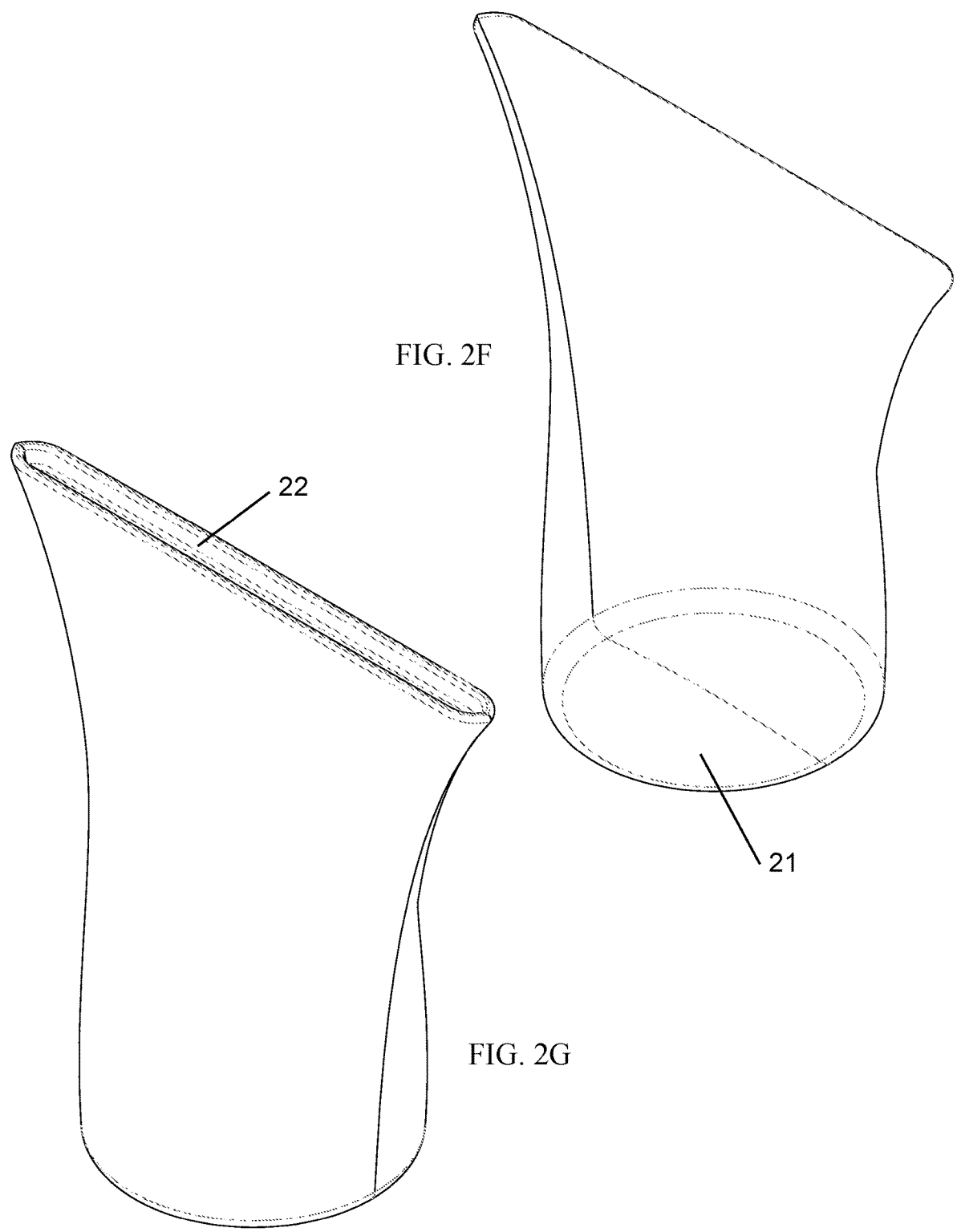

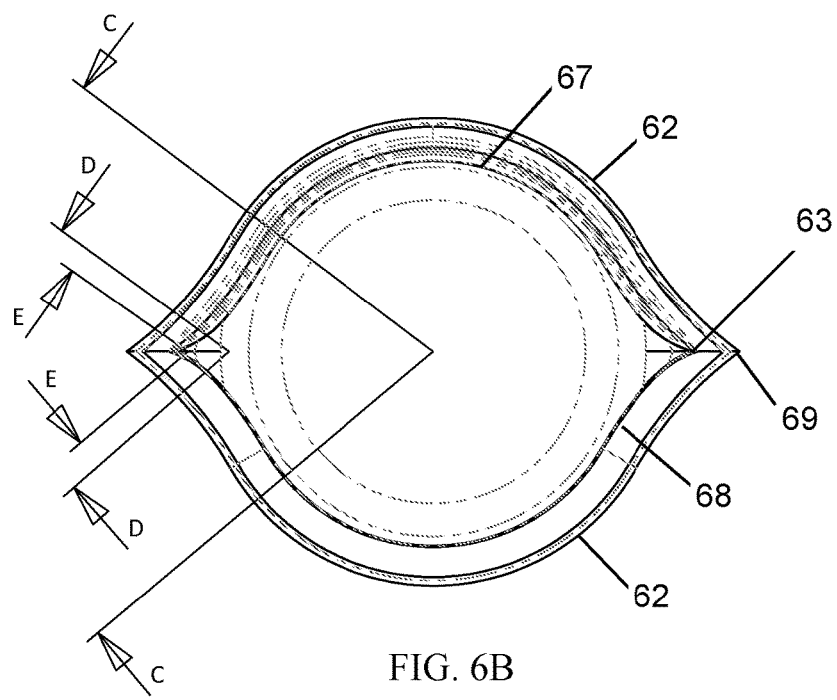
FIG. 6B
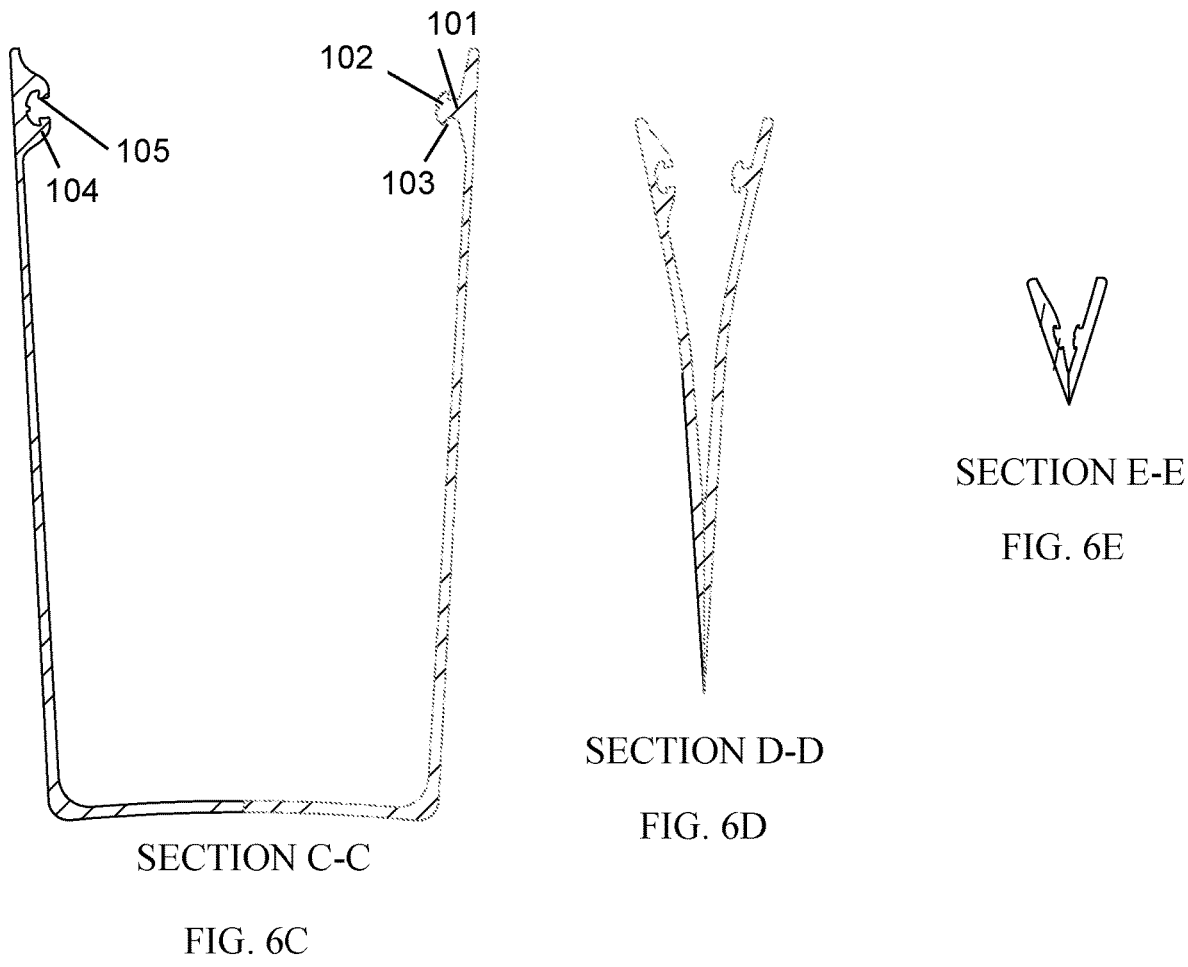
SECTION C-C
FIG. 6C
SECTION D-D
FIG. 6D
SECTION E-E
FIG. 6E

SECTION G-G

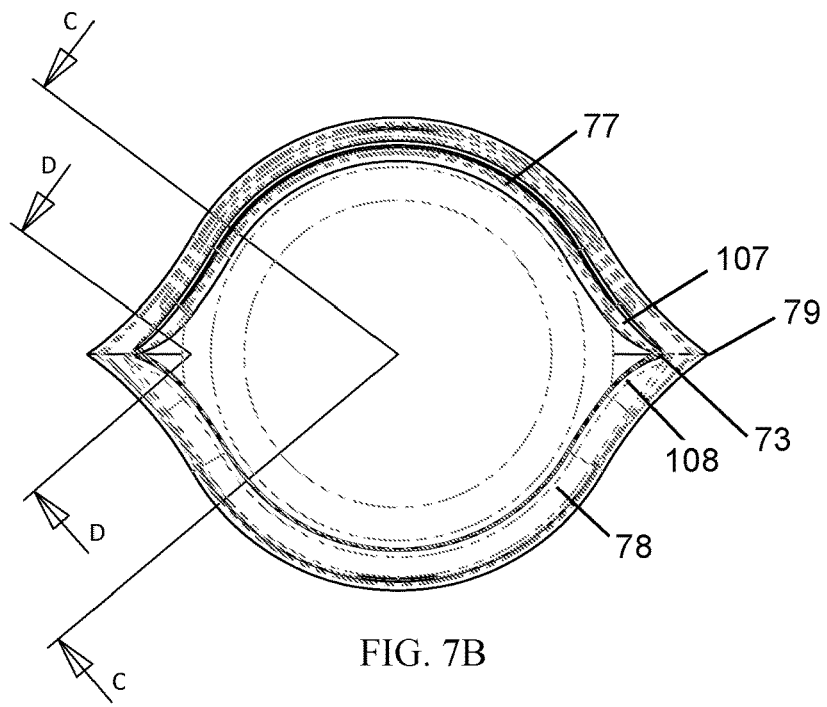
FIG. 7B
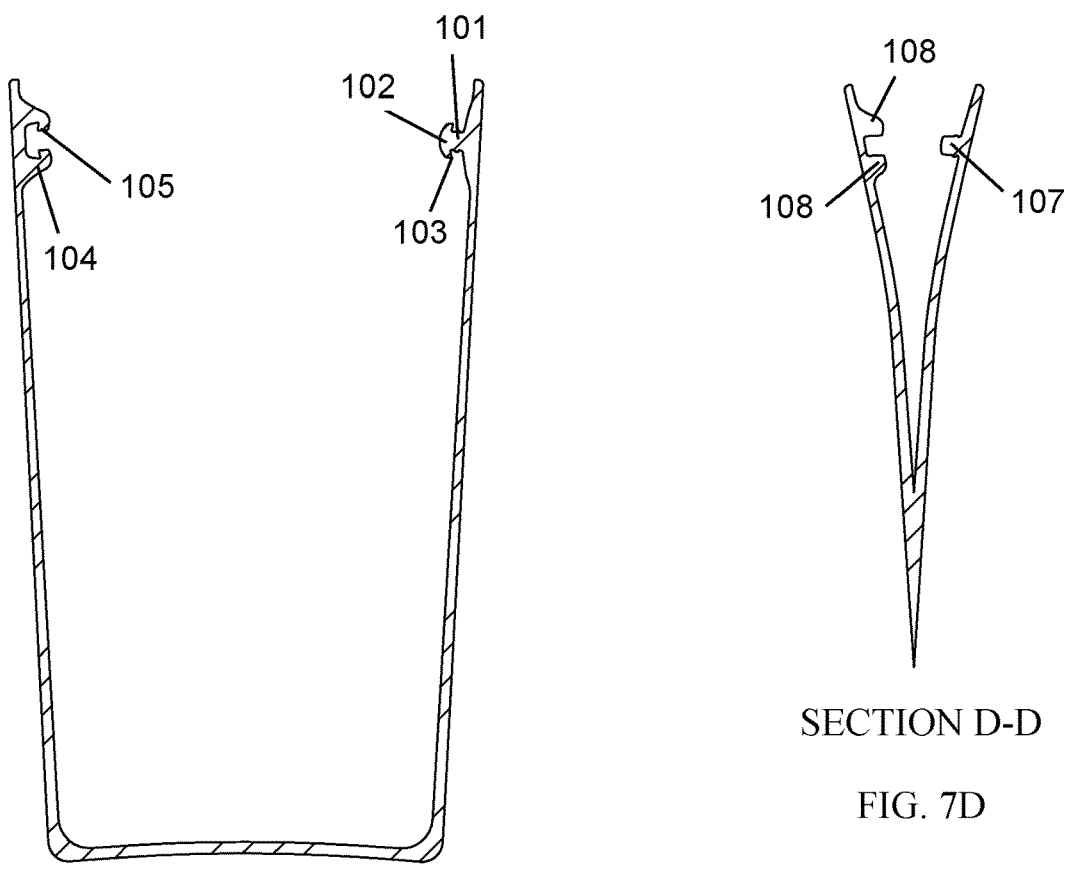
SECTION C-C
FIG. 7C
SECTION D-D
FIG. 7D

FLEXIBLE CONTAINER WITH SPOUTS AND CLOSURE

CONTINUATION STATEMENT

This application is a continuation-in-part of U.S. application Ser. No. 15/910,757, filed Mar. 2, 2018.

TECHNICAL FIELD

The present disclosure relates generally to the field of sealable cups, bowls and tumblers made of silicone.

BACKGROUND

U.S. Pat. No. 6,197,359, incorporated herein by reference, describes the use of silicone for manufacturing of confectionery molds and baking receptacles, wherein silicone may be used for applications in contact with foodstuffs, in particular, methyl-vinyl-polysiloxane obtained by a process of cross-linking with platinum. Silicone is a material of polymeric nature whose chains are made up of alternating oxygen and silicon atoms. Silicones are normally prepared by hydrolysis and subsequent polymerisation of alkylhalogensilanes (both acid- and base-catalysed). The alkylhalogensilanes are in practice made by a direct process, Cu-catalysed, in which the Si reacts with the corresponding alkyl halide. This process provides mixtures of products, whose composition can be modified by a process of redistribution to yield the desired monomer. Known in the art are silicone elastomers, which are made up of linear polymers. A cross-linking phase is required in order to provide the elastic properties. The most common elastomers are those deriving from dichloromethylsilane, with molecular weights ranging between 300,000 and 700,000. They are made by a prepolymerisation that provides octamethylcyclotetrasiloxane, purification thereof and subsequent polymerisation in the presence of a small quantity of monofunctional material in order to control the molecular weight, followed by a cross-linking similar to curing, in the presence of peroxides, which lends the material its elastic properties. Other important elastomers are those that contain a small proportion (0.1% molar) of vinyl groups linked to silicon, which undergo much more effective curing, and those that contain between 10 and 15% molar of phenyl groups, and good elastic properties at low temperatures. Elastomers of a much lower molecular weight (10,000 to 100,000) can be obtained by using linear polymer chains ending in silanol groups, which can be cured at room temperature by reaction with an alkoxylane. In general, the most important characteristic of the silicone elastomers is the fact that they present a very broad thermal spectrum of use (from −50° C. to 200° C.) without a significant alteration of their properties. They have good electrical insulation properties, do not self-oxidise or undergo attack by chemical agents in aqueous medium and swell in the presence of non-polar organic solvents, although some special types that contain fluoro- or cyano-groups offer greater resistance to this process.

Silicone elastomers find their widest industrial application as electrical insulators, fluid-repellents and oxidation protectors, and in the manufacturing of hermetic gaskets. The silicones are highly inert materials, and they repel water. Silicone is inert to chemical agents, with the exception of strong bases and acids, and its toxicity is generally low. The origin of these properties lies essentially in the high stability of the Si—O bond (106 Kcal/mol), and in its strong partial ionic character. Other known uses of silicones are in the manufacturing of containers for liquids (such as wineskins) and tubes for transporting substances (such as the tubes used for blood transfusions).

U.S. Publication 2014/0270579, incorporated herein by reference, discloses a silicone bag. In particular, the publication teaches a bag having a front and back portion which are comprised of silicone or a similar elastomer. The front and back portion are identical in size and are sealed together along their sides and bottom with a mouth along the top portion. The mouth creates a cavity from which items are placed in and stored or transported for further use. A sealing mechanism (ribs pressed into slots) on top of the bag seals items in the bag. The bag is molded entirely of silicone, including the sealing mechanism, to be water tight.

U.S. Publication 2014/0245698, incorporated herein by reference, discloses a package having a foldable top region. The package generally includes panel portions that at least partially define an interior cavity there between and accessible through an access mouth. The top portion can provide a cuff member or cuff region that can be folded and unfolded to facilitate use of the package as a bowl or other cuffed container for material contents. The package can be adapted to hold its shape as a bowl or cuffed container. A reclosure member can be provided to facilitate re-sealing of the package. A folding strip, edge contours and stiffening members can also be provided.

U.S. Publication 2009/0110335, incorporated herein by reference, discloses a reclosable food storage bag able to withstand a wide temperature range manufactured from environmentally sensitive materials is disclosed. The bag can be manufactured from such materials as silicone rubber and thermoset resins. By using such materials, the bag can easily withstand the temperature ranges encountered in residential kitchens extending from the freezer to the oven and all ambient temperatures there between. In addition, by manufacturing the bag from such materials, the environmental impact of using petroleum based polymers is avoided.

U.S. Pat. No. 9,371,153, incorporated herein by reference, discloses a container made of an elastomer such as silicone with an integrated leak resistant seal having press-fit elements. The sizes and shapes of the press-fit elements seal the mouth to resist leakage of liquids from inside the container. No external clips or clasps are needed for the seal. Extended flaps facilitate pulling the sides open. The container itself may be of asymmetrical shape, e.g. trapezoidal.

SUMMARY

In accordance with the teachings of the present disclosure, containers such as cups, bowls and tumblers made of silicone are provided that have spouts and zipper members for sealing the mouth of the container.

An aspect of the invention provides a container comprising: a base and freestanding sides extending from the base to define a mouth opposite the base, wherein the mouth has first and second spouts opposite each other and first and second interior sides opposite each other between the first and second spouts; a first zipper member extending from the first interior side of the mouth from the first spout to the second spout; a second zipper member extending from the second interior side of the mouth from the first spout to the second spout, wherein the mouth is deformable between open and closed configurations and the first and second zipper members are disengagable when the mouth is open and engagable when the mouth is closed, wherein the base, sides, and zipper members are a unitary whole container without assembled parts, wherein the container comprises silicone.

A further aspect of the invention provides a container made by a molding process, wherein the container comprises: a base and freestanding sides extending from the base to define a mouth opposite the base, wherein the mouth has first and second spouts opposite each other and first and second interior sides opposite each other between the first and second spouts; a first zipper member extending from the first interior side of the mouth from the first spout to the second spout; a second zipper member extending from the second interior side of the mouth from the first spout to the second spout, wherein the mouth is deformable between open and closed configurations and the first and second zipper members are disengagable when the mouth is open and engagable when the mouth is closed, wherein the base, sides, and zipper members are a unitary whole container without assembled parts, wherein the container comprises silicone, wherein the molding process comprises a silicone molding process selected from liquid injection molding, compression molding, and transfer molding.

BRIEF DESCRIPTION OF THE DRAWINGS

A more complete understanding of the present embodiments may be acquired by referring to the following description taken in conjunction with the accompanying drawings, in which like reference numbers indicate like features.

FIGS. 1H, 1I and 1J show end, side and bottom views, respectively, of the short container of FIGS. 1F and 1G.

FIGS. 2C, 2D and 2E show end, side and bottom views, respectively, of the tumbler of FIGS. 2A and 2B.

FIGS. 2F and 2G illustrate perspective views of a tumbler in a closed configuration.

FIG. 6B shows a top view of the tumbler of FIG. 6A with cross-sections indicated.

FIGS. 6C, 6D and 6E are cross-sectional end views of the indicated cross-sections of FIG. 6B.

FIG. 7B shows a top view of the tumbler of FIG. 6A with cross-sections indicated.

FIGS. 7C and 7D are cross-sectional end views of the indicated cross-sections of FIG. 7B.

DETAILED DESCRIPTION

Figure 1A:
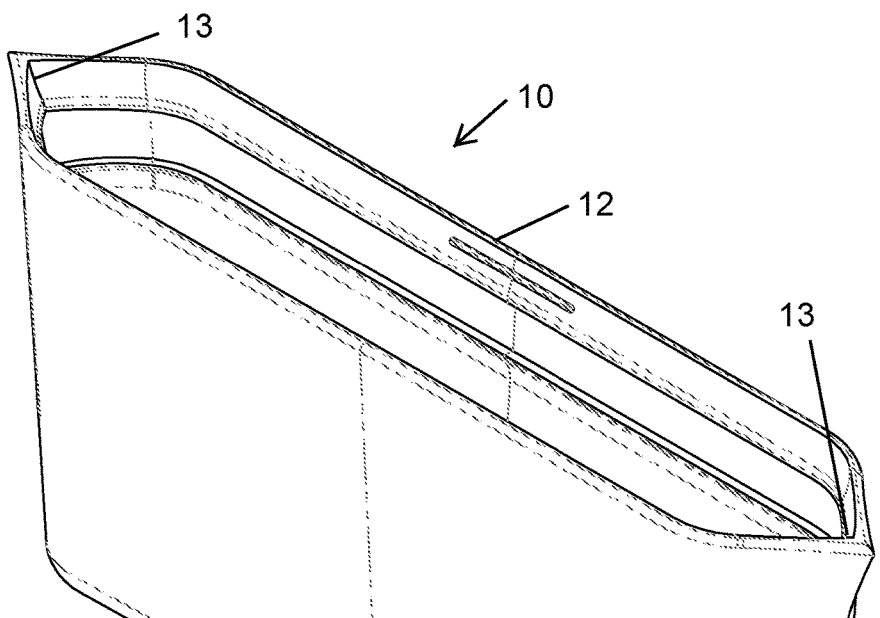
FIGS. 1A and 1B illustrate perspective views of a short container in an open configuration.

Preferred embodiments are best understood by reference to FIGS. 1-7D below in view of the following general discussion. The present disclosure may be more easily understood in the context of a high level description of certain embodiments.

Embodiments of the present invention provide a cup or a bowl that stands on its own and zips at the top like a re-sealable zipper storage bag. The cup or bowl may be made with silicone in one piece, be flexible, be food grade, and be dishwasher/microwave safe. The cup or bowl may be used as a dish/cup. The cup or bowl may be used as a storage container. In particular, the cup or bowl may be great for travel.

The material may be thicker at the base for stability. The top may be thinner and more flexible. The zipper may be a tongue and groove configuration wherein a male portion is mated with a female portion to make the seal. The zipper may be a dual zipper or triple zipper. A clasp may be assembled to the exterior of the zipper for sliding along the zipper to assist with the mouth and/or closing of the zipper. The zipper may comprises male and female members that engage to seal the mouth. For purposes of this disclosure the mouth is considered sealed by the zipper members when the zipper members engage sufficiently to remain closed independent of any outside influences and retain water inside an up-side-down container. Containers may hold between 1 and 20 cups of water volume.

The container with zipper members may be molded as one unitary whole, in particular, without assembled parts. For example, to make a container that is a unitary whole without assembled parts, the entirety of the container with all its parts including zipper members may be compression molded, liquid injection molded, transfer molded or molded by any similar process. Overmolding may be included in these molding processes, wherein the zipper members may first be separately molded and then placed inside the container mold so that when the container is molded, the zipper members become "overmolded" or "encapsulated" by the liquid silicone being injected in the mold to form the container, and thereby become a unitary whole with the container. The zipper members and container may be made to become a unitary whole by separately forming or molding and then placing them in contact when the silicone material when it is not fully crosslinked (cured), and then postbaking the parts to vulcanize the whole thing. The zipper members or other portions of the container may be made from a harder durometer or different material injected into the mold, so that it may be a dual-durometer or co-molded product.

Silicone, in particular, titanium silicone may be used. A silicone having a durometer of between 30-80 shore A, for example, may be used. The silicone may have an elongation a break between 290% and 620%. The silicone may have a tear strength of 21-33 N/mm.

One aspect of the invention is to use a liquid silicone rubber injection mold process to make the container as a single unitary product. Uncured liquid silicone rubber may start as two materials: a base-forming material and a catalyst. The materials may be released into a mixing chamber, wherein color pigmentations or other additives may also be released into the mixing chamber. A specific volume may be injected into the mold as an appropriate shot size for each job. Temperature, pressure, injection rate and cycle time may be adjusted depending on the size and shape of the container being molded. The mold may comprise two or more plates. Liquid silicone rubber may be injected into a preheated mold to push the material into the mold and cavities therein. The liquid silicone rubber is cured in the mold by the application of heat and pressure until it solidifies. A rate of silicone shrinkage should be considered. Because silicone is an elastic material, flashing may occur when removed from the cavity of a mold. Flashing can be removed from the molded container automatically or manually.

Another aspect of the invention is to use a high consistency silicone rubber compression mold process to make the container as a single unitary product. Granular bulk silicone material is pre-catalyzed by adding powder. An exact amount of silicone required to make the container is determined. A determined amount of silicone is cut and weighed and strategically placed in a mold cavity. The silicone material may be pre-shaped to the approximate configuration of the container so that it fills all portions of the interior of the mold. The mold is heated to 300 degrees Celsius or higher as force is applied by compressing the silicone between the plates of the mold to flow the silicon into the cavities of the mold. The silicone is cured or vulcanized by an irreversible chemical reaction under heat and pressure to make a highly cross-linked molecular structure. The mold is opened and the molded container is removed. Flashing can be removed from the molded container automatically or manually.

According to certain embodiments of the invention, one feature is to have a free standing container with a zipper seal of the mouth at the top, wherein the mouth remains open when unsealed. A benefit to users is that the mouth of the contain remains open in a free standing position, so users may pour or spoon contents into or out of the container without having to hold open the mouth of the container. To enable this feature, the container may be silicone molded in in an open position, so that the finished container naturally wants to assume an open position. The zipper members may be silicone molded in straight molds so that by themselves they naturally tend to assume straight positions. When the zipper members are then joined in the zipper slots of the container, the combination tends to cause the mouth of the container to naturally assume an open eye-shape when free-standing.

The figures show perspective, side and end views of separate cups, bowls or containers. Each cup, bowl or container is made of a flexible material that is sufficiently rigid in the base regions to stand on their own, but sufficiently flexible in the closure region to allow the mouths to transition between open and closed configurations.

FIGS. 1A-1J show perspective, side and end views of a short container. The short container 10 comprises a base 11 that is generally oval in shape. The short container 10 further comprises a mouth 12 at the top, wherein the mouth is generally circular when open and general linear when closed. The base 11 comprises a wall thickness and material composition that has sufficient stiffness or rigidity to resist deformation in response to applied forces. The mouth 12 comprises wall thicknesses and material compositions that are sufficiently flexible or pliable to allow the mouth 12 to be deformed between open and closed configurations. In one embodiment, the short container 10 may have wall thicknesses or rigidity that vary uniformly from the base 11 to the mouth 12, wherein the wall thicknesses are thicker or more rigid at the base 11 and thinner or less rigid at the mouth 12. The short container 10 may have a zipper slot 13 near the mouth 12 to seal the mouth in a closed configuration.

Figure 1B:
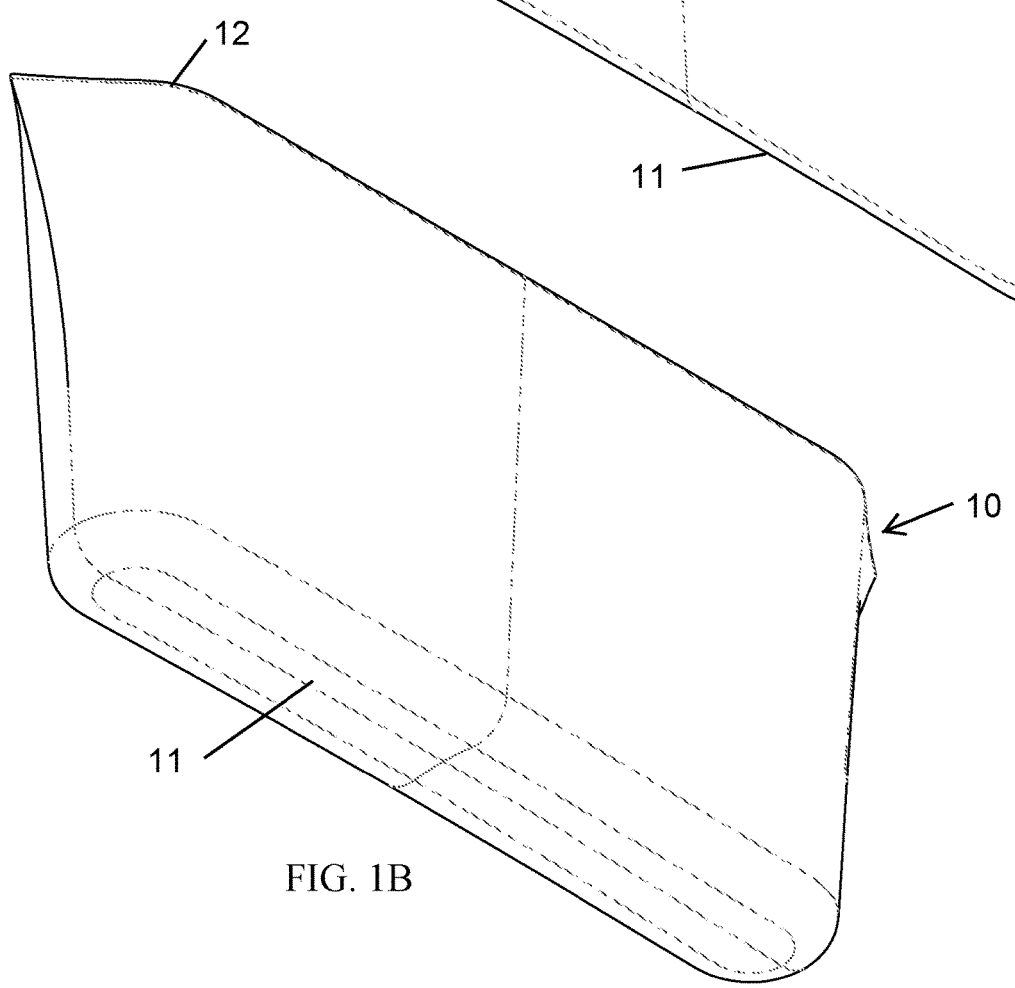
Figure 1C:
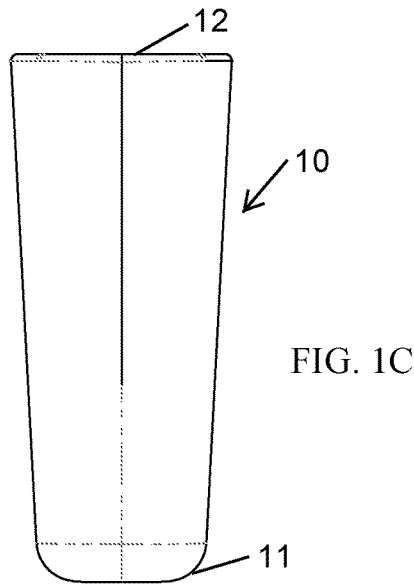
FIGS. 1C, 1D and 1E show end, side and bottom views, respectively, of the short container of FIGS. 1A and 1B.
Figure 1D:
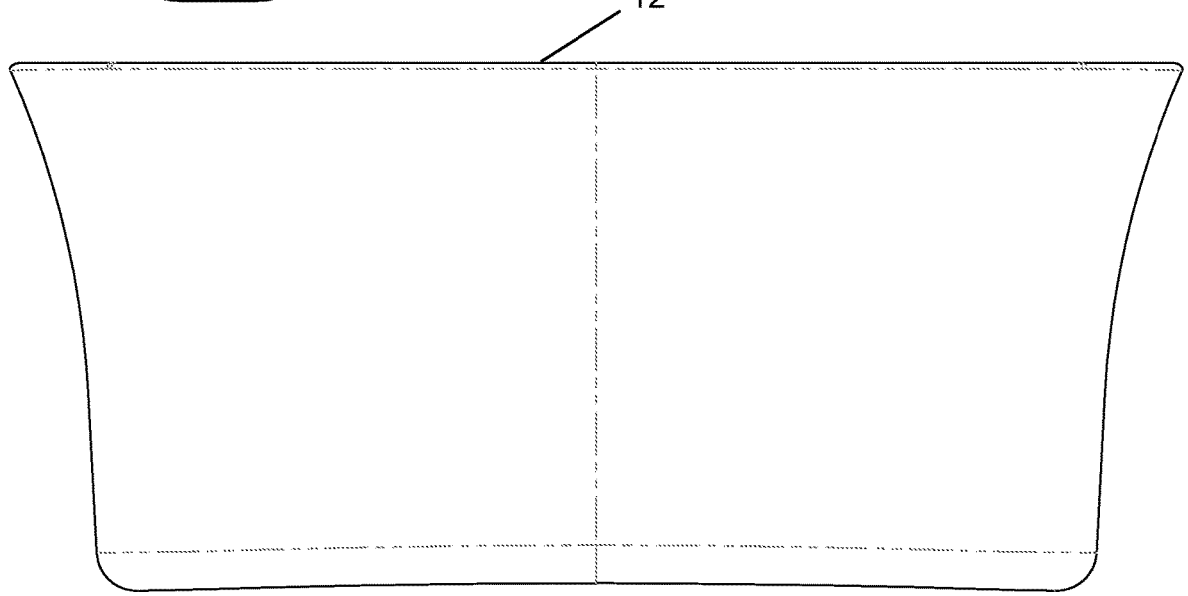
Figure 1E:
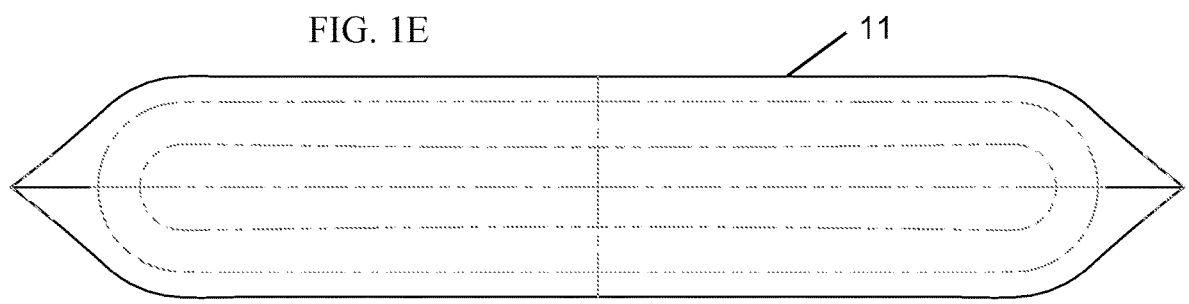

FIG. 1A is a perspective view of the short container 10 in an open configuration wherein the view is looking down through the mouth into the interior of the short container 10. FIG. 1B is a perspective view of the short container 10 in an open configuration wherein the view is looking up toward the base 11. FIG. 1C is an end view of the short container 10 in an open configuration, wherein the view from each end is identical. FIG. 1D is a side view of the short container 10 in an open configuration, wherein the views from both the front and back are identical. FIG. 1E is a bottom view of the short container 10 in an open configuration.

Figure 1F:
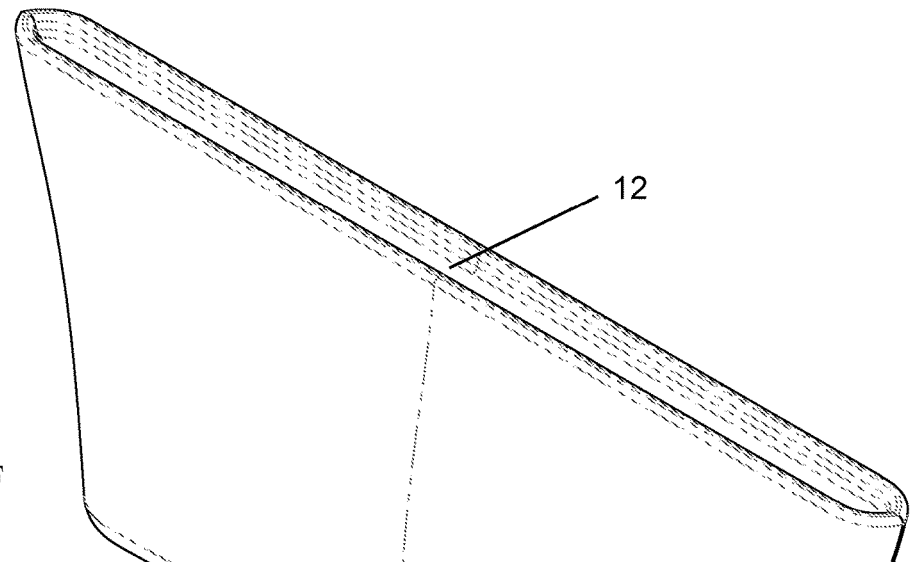
FIGS. 1F and 1G illustrate perspective views of a short container in a closed configuration.
Figure 1G:
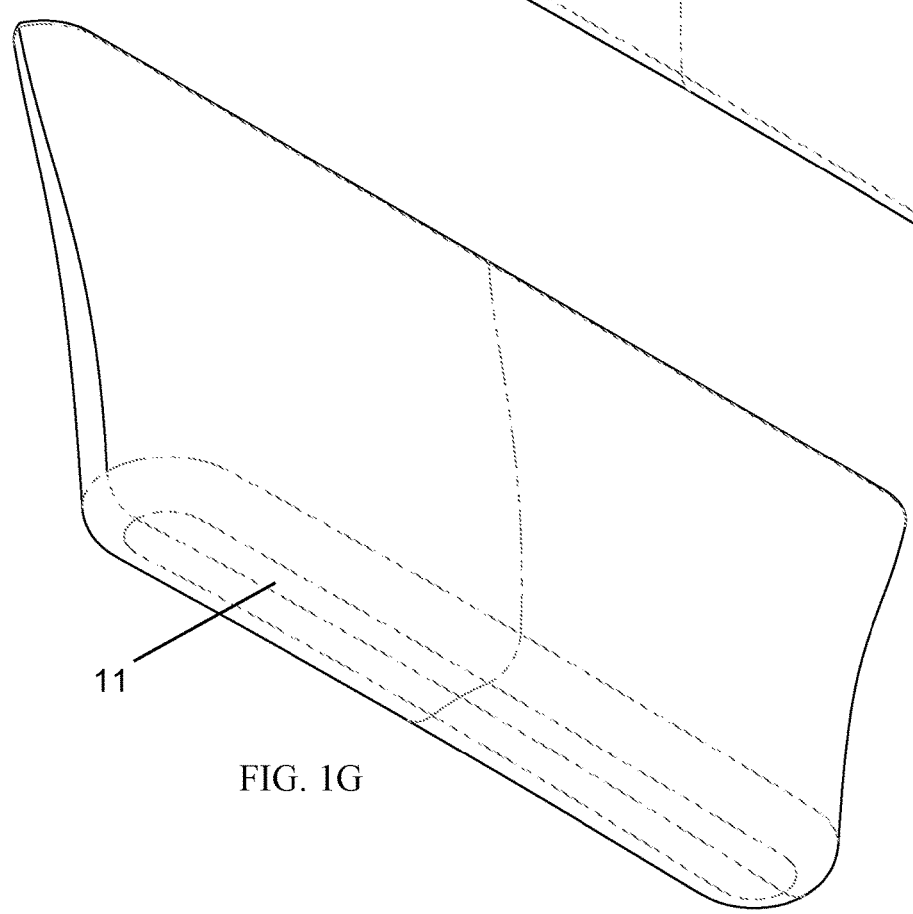

FIG. 1F is a perspective view of the short container 10 in a closed configuration wherein the view is looking down at the closed mouth 12 of the short container 10. FIG. 1G is a perspective view of the short container 10 in a closed configuration wherein the view is looking up toward the base 11. FIG. 1H is an end view of the short container 10 in a closed configuration, wherein the view from each end is identical. FIG. 1I is a side view of the short container 10 in a closed configuration, wherein the views from both the front and back are identical. FIG. 1J is a bottom view of the short container 10 in a closed configuration.

In alternative embodiments, the base 11 of the short container 10 may be any geometric shape, for example, square, rectangle, triangle, octagon, hexagon, oval, etc. Further, the mouth 12 may also be of any geometric shape. Still further, cross-sections of the short container 10 between the base 11 and the mouth 12 may be of any geometric shape. In some embodiments of the invention, the base 11, mouth 12, and cross-sections between the base 11 and mouth 12 all have the same geometric shape. In still other embodiments of the invention, the base 11, mouth 12, and cross-sections between the base 11 and mouth 12 have different geometric shapes.

FIGS. 2A-2J show perspective, side and end views of a tumbler. The tumbler 20 comprises a base 21 that is generally circular in shape. The tumbler 20 further comprises a mouth 22 at the top, wherein the mouth is generally circular when open and general linear when closed. The base 21 comprises a wall thickness and material composition that has sufficient stiffness or rigidity to resist deformation in response to applied forces. The mouth 22 comprises wall thicknesses and material compositions that are sufficiently flexible or pliable to allow the mouth 22 to be deformed between open and closed configurations. The tumbler 20 may have a zipper slot 23 near the mouth 22 to seal the mouth in a closed configuration. The tumbler 20 may have wall thicknesses and rigidity that vary uniformly from the base 21 to the mouth 22, wherein the wall thicknesses are thicker or more rigid at the base 21 and thinner or less rigid at the mouth 22.

Figure 2A:
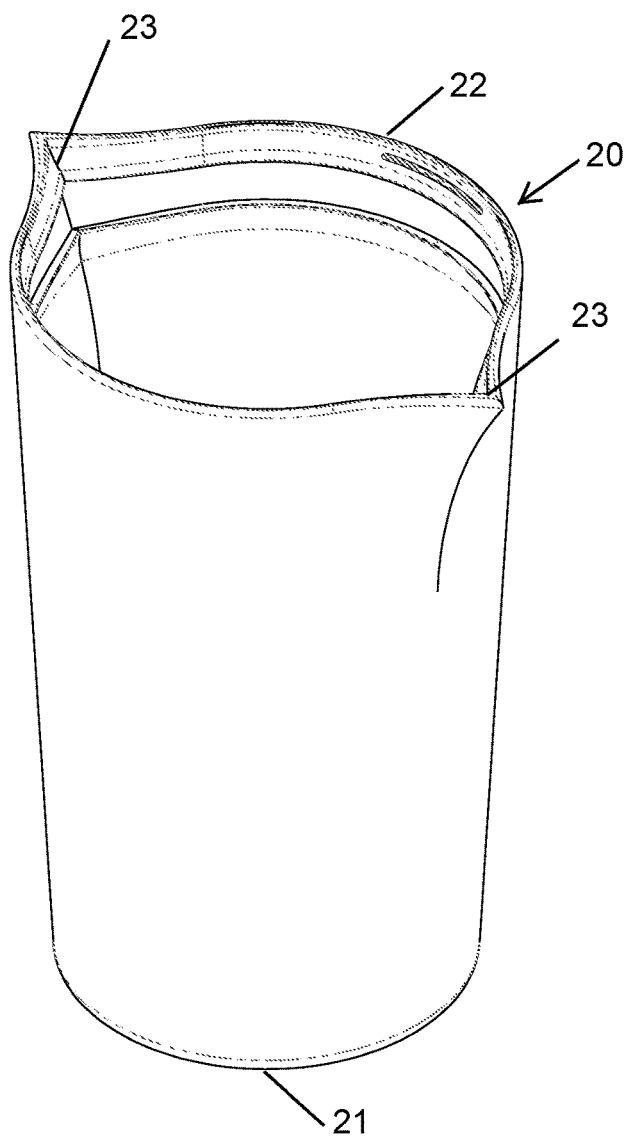
FIGS. 2A and 2B illustrate perspective views of a tumbler in an open configuration.
Figure 2B:
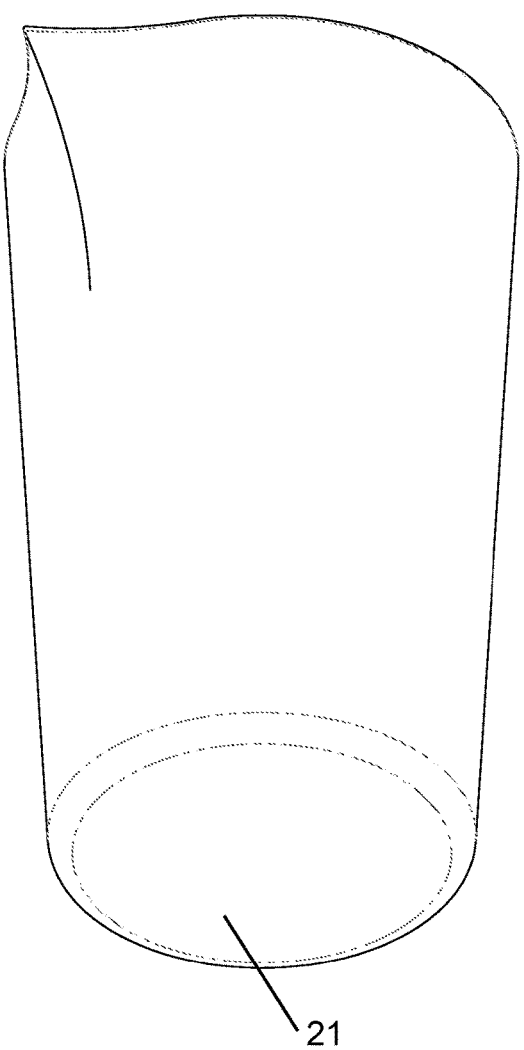

FIG. 2A is a perspective view of the tumbler 20 in an open configuration wherein the view is looking down through the mouth into the interior of the bowl 20. FIG. 2B is a perspective view of the tumbler 20 in an open configuration wherein the view is looking up toward the base 21. FIG. 2C is an end view of the tumbler 20 in an open configuration, wherein the view from each end is identical. FIG. 2D is a side view of the tumbler 20 in an open configuration, wherein the views from both the front and back are identical. FIG. 2E is a bottom view of the tumbler 20 in an open configuration.

Figure 2H:
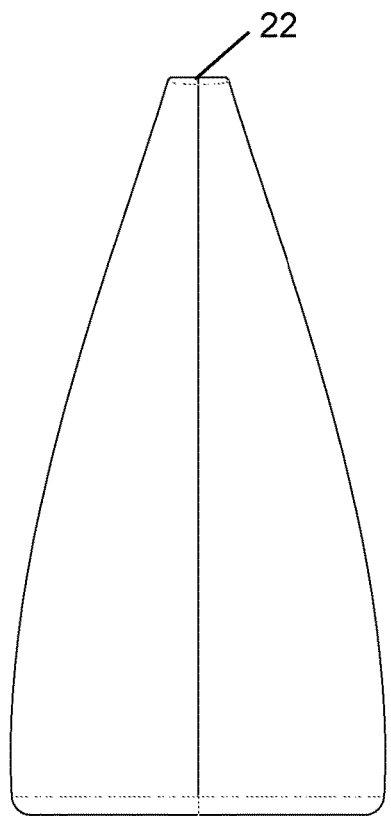
FIGS. 2H, 2I and 2J show end, side and bottom views, respectively, of the tumbler of FIGS. 2F and 2G.
Figure 2I:
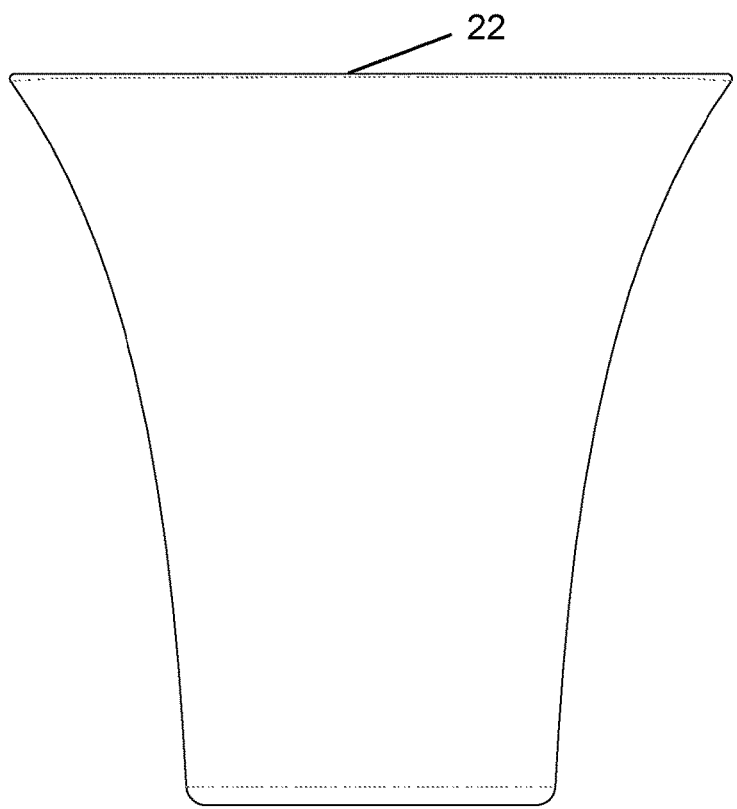
Figure 2J:
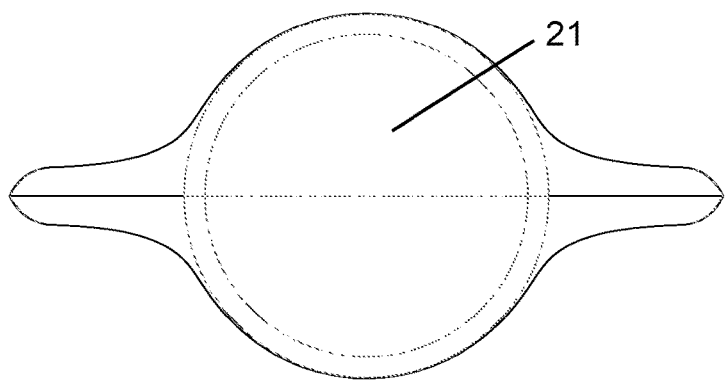

FIG. 2F is a perspective view of the tumbler 20 in a closed configuration wherein the view is looking down at the closed mouth 22 of the tumbler 20. FIG. 2G is a perspective view of the tumbler 20 in a closed configuration wherein the view is looking up toward the base 21. FIG. 2H is an end view of the tumbler 20 in a closed configuration, wherein the view from each end is identical. FIG. 2I is a side view of the tumbler 20 in a closed configuration, wherein the views from both the front and back are identical. FIG. 2J is a bottom view of the tumbler 20 in a closed configuration.

In alternative embodiments, the base 21 of the tumbler 20 may be any geometric shape, for example, square, rectangle, triangle, octagon, hexagon, oval, etc. Further, the mouth 22 may also be of any geometric shape. Still further, cross-sections of the tumbler 20 between the base 21 and the mouth 22 may be of any geometric shape. In some embodiments of the invention, the base 21, mouth 22, and cross-sections between the base 21 and mouth 22 all have the same geometric shape. In still other embodiments of the invention, the base 21, mouth 22, and cross-sections between the base 21 and mouth 22 have different geometric shapes.

Figure 3A:
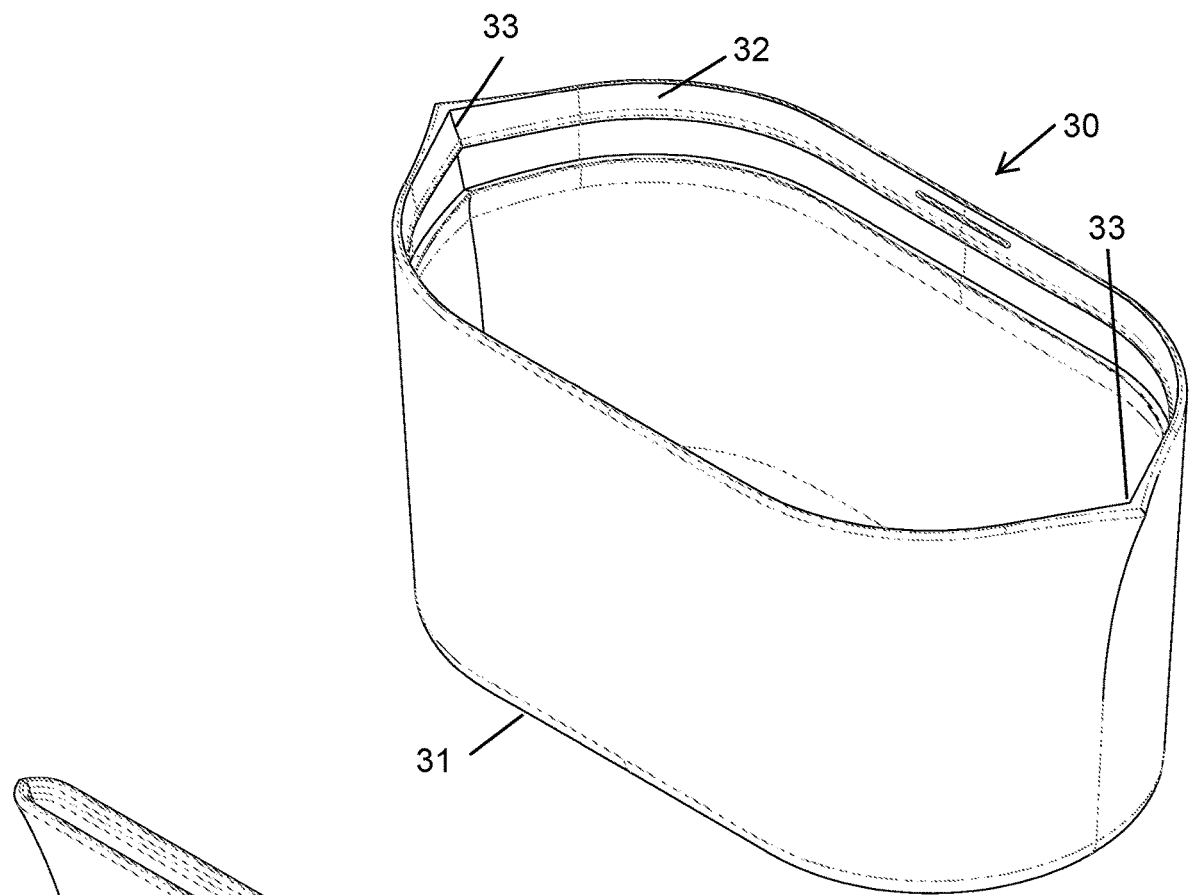
FIGS. 3A and 3B illustrate perspective views of a bowl in open and closed configurations, respectively.
Figure 3B:
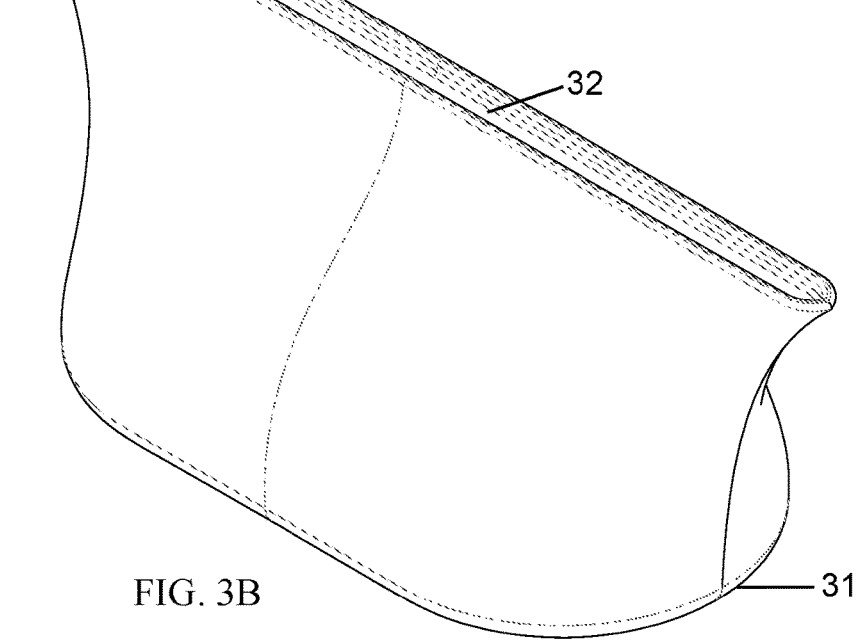

FIG. 3A is a perspective view of the bowl 30 in an open configuration wherein the view is looking down through the mouth 32 into the interior of the bowl 30. A zipper slot 33 is just inside the mouth 32. The bowl 30 stands vertically upright on a base 31. FIG. 3B is a perspective view of the bowl 30 in a closed configuration wherein the view is looking down at the closed mouth 32 of the bowl 30.

Figure 4A:
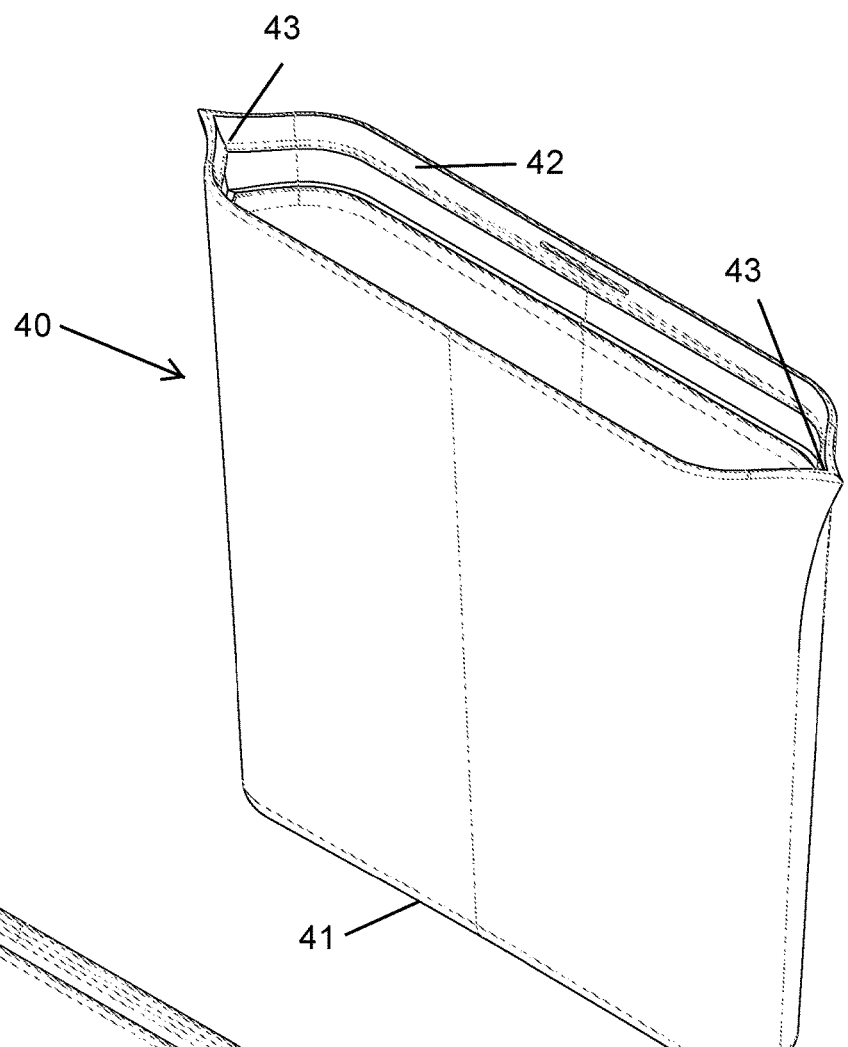
FIGS. 4A and 4B illustrate perspective views of a tall container in open and closed configurations, respectively.
Figure 4B:
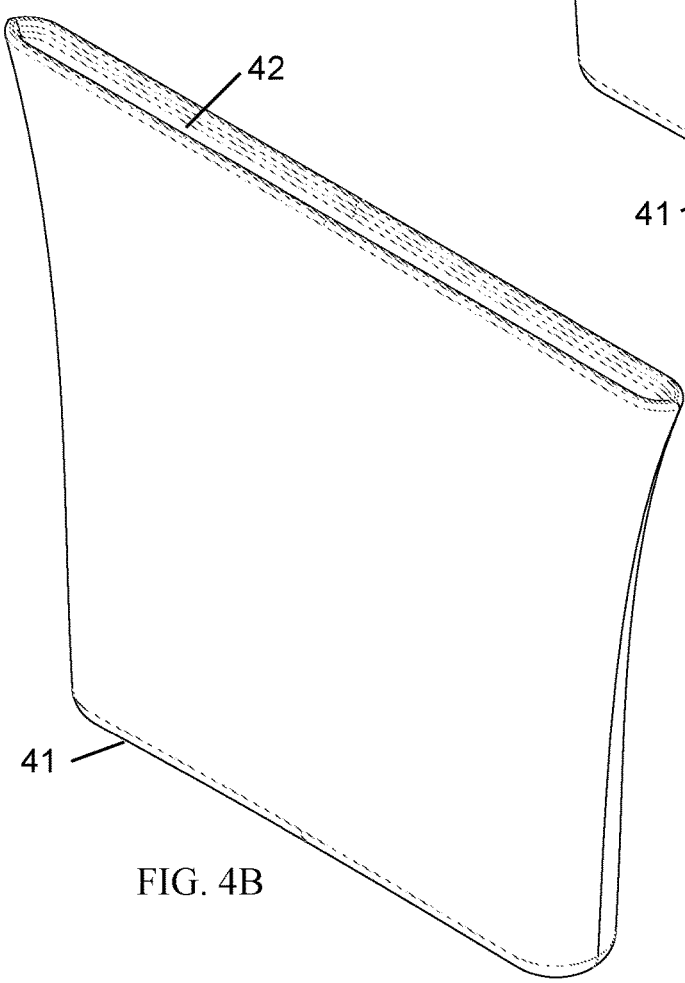

FIG. 4A is a perspective view of a tall container 40 in an open configuration wherein the view is looking down through the mouth 42 into the interior of the tall container 40. The tall container 40 stands vertically on its base 41 with the mouth 42 at the top. A zipper slot 43 is just inside the mouth 42. FIG. 4B is a perspective view of the tall container 40 in a closed configuration wherein the view is looking down at the closed mouth 42 of the tall container 40.

FIG. 5 shows a perspective view of a tumbler 50. The tumbler 50 comprises a base 51 that is circular in shape. The tumbler 50 further comprises a mouth 52 at the top, wherein the mouth 52 is generally circular when open and generally linear when closed. The tumbler 50 further comprises a rim 54 between the base 51 and the mouth 52. The tumbler 50 comprises a lower wall 55 between the base 51 and the rim 54 having a thickness and material composition that has sufficient stiffness or rigidity to resist deformation in response to applied forces, so that the tumbler 50 may freely stand vertically on its base 51. Further, the tumbler 50 has an upper wall 56 between the base 51 and the rim 54 having a wall thickness and material composition sufficiently flexible or pliable to allow the mouth 52 to be deformed between open and closed configurations. In one embodiment, the circumference of the upper wall 56 above the rim 54 may be larger than the circumference of the lower wall 55 below the rim 54, so that the upper wall 56 may be rolled or folded down over the exterior of the lower wall 55 below the rim 54. In a rolled or folded down configuration, the bowl 50 may more fully function as a traditional bowl. To seal the tumbler 50, the upper wall 56 may be unrolled or unfolded to an extended position, as shown in FIG. 5, and a zipper in the zipper slot 53 may be zipped to form a seal. Embodiments of a container, cup or bowl may be similar to the tumbler 50 shown in FIG. 5.

Some embodiments of the invention, made of silicone, have base and sidewall thicknesses greater than 0.5 mm. Other embodiments of the invention, made of silicone, have base and sidewall thicknesses between about 0.7 mm and about 1.3 mm. Still further embodiments of the invention, made of silicone, have base and sidewall thicknesses of about 1.0 mm.

The tumblers, cups or bowls may be made of silicone material that is either transparent or opaque and made to be any color. The silicone may be of a quality and composition appropriate for applications in contact with foodstuffs. In particular, methyl-vinyl-polysiloxane obtained by a process of cross-linking with platinum may be an appropriate silicone. Material may include polyurethane rubber, tin-cured silicone rubber, and platinum-cured silicone rubber. Numeric markers may be added to indicate volumetric measurements within the cups, bowls or tumblers.

Figure 5A:
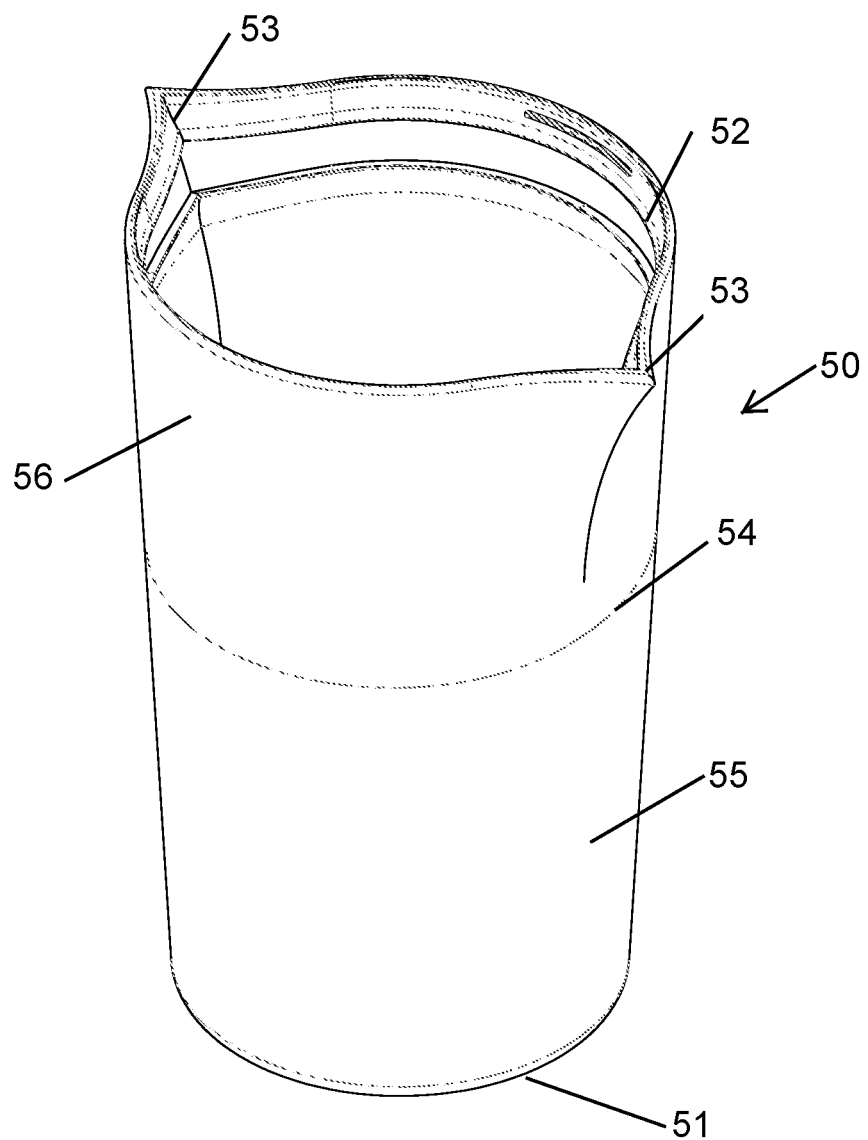
FIG. 5A illustrates a perspective view of a tumbler in an open configuration.
Figure 5B:
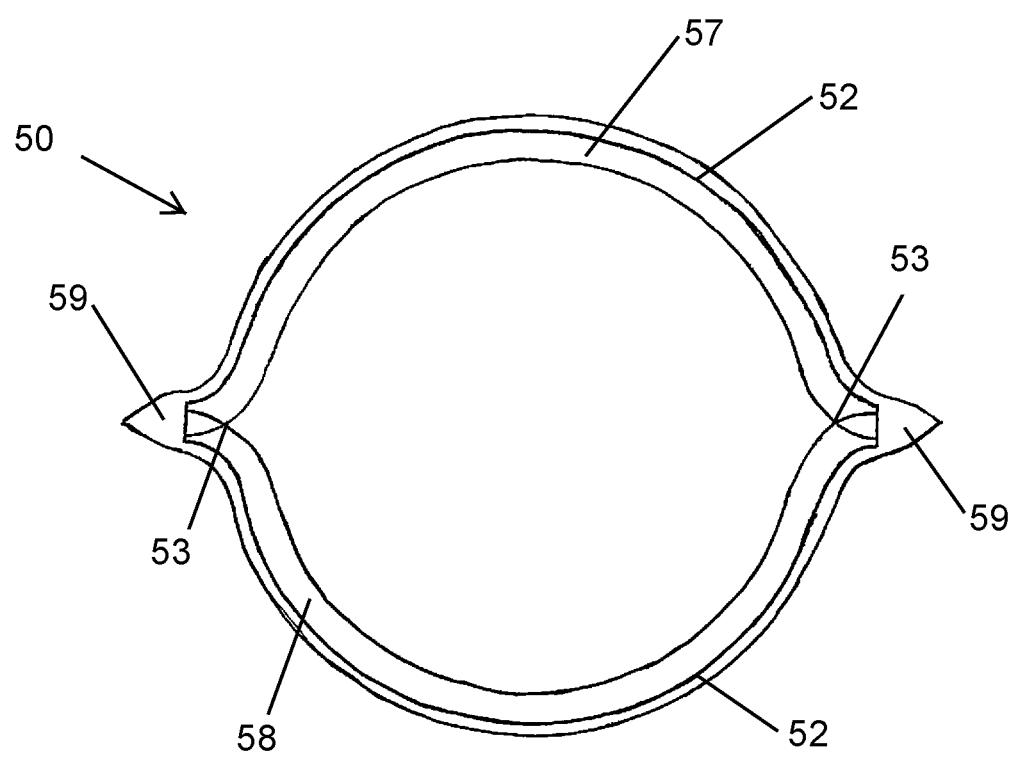
FIG. 5B shows a top view of the tumbler of FIG. 5A, wherein the zipper members cross over and remain engaged at the spouts.

FIG. 5B is a cross-sectional top view of the tumbler shown in FIG. 5A, wherein male and female zipper members 57 and 58 are shown. The male zipper member 57 is positioned just inside the mouth 52 and extends from one interior side of the tumbler 50. The female zipper member 58 is positioned just inside the mouth 52 and extends from the other side of the tumbler 50. In this embodiment, the tumbler 50 has relatively thick tips 59 at opposite ends of the mouth 52, wherein each tip 59 form an interior wall transverse to the axis of the mouth 52. The exterior surfaces of tips 59 provide "handles" for a user to hold the tumbler 50 while closing the zipper members 57 and 58 together. The zipper members terminate at the interior walls of the tips 59 to completely seal the mouth 52 of the tumbler 50 when closed. The zipper members 57 and 58 "cross over" each other at the tips 59 so that the male and female zipper elements completely engage at the tips 59, even when the mouth 52 of the tumbler 50 is open as shown in FIG. 5B. To close the mouth 52, a user simply squeezes the sides of the mouth 52 together and pinches the zipper members 57 and 58 together until the male and female zipper members 57 and 58 are completely engaged from tip 59 to tip 59. When open, the mouth 52 forms a spout 53 at each tip 59

Figure 5C:
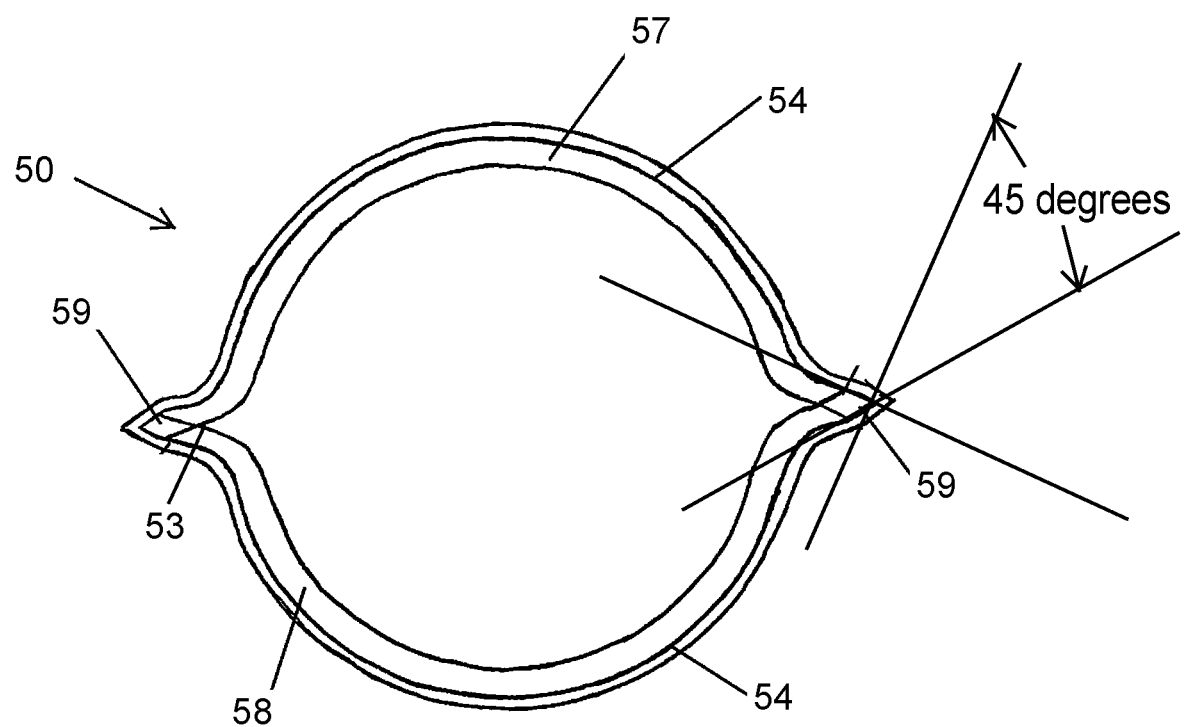
FIG. 5C shows a top view of the tumbler of FIG. 5A, wherein the zipper members cross over and remain engaged at the spouts.

FIG. 5C is a cross-sectional top view of an alternative tumbler 50 shown in FIG. 5A, wherein male and female zipper members 57 and 58 are shown. Similar to the embodiment shown in FIG. 5B, the male zipper member 57 is positioned just inside the mouth 52 and extends from one interior side of the tumbler 50 and the female zipper member 58 is positioned just inside the mouth 52 and extends from the other side of the tumbler 50. However, in this embodiment, the tips 59, formed at each end of the mouth 52, have relatively thin wall thicknesses and each tip 59 does not form an interior wall transverse to the axis of the mouth 52. The wall thicknesses in the region of the tip 59 is approximately the same as the side walls forming the mouth 52. The male and female zipper members 57 and 58 extend all the way to the most extreme ends of the tips 59 and "cross over" each other at the tips 59. The ends of the zipper members 57 and 58 are angled at about 45 degrees, so that when the zipper members 57 and 58 are closed together, they seal the zipper at the tips 59.

FIGS. 6A-6E show perspective, top and cross-sectional end views of a tumbler 60. The tumbler 60 comprises a base 61 that is generally circular in shape. The tumbler 60 further comprises a mouth 62 at the top, wherein the mouth is generally circular when open and generally linear when closed. At each end of the interior of the mouth 62, the tumbler 60 has a spout 63. In this embodiment, the tips 69, formed at each end of the mouth 62, have wall thicknesses approximately the same as the side walls forming the mouth 62. The male zipper member 67 is positioned just inside the mouth 62 and protrudes from one interior side of the tumbler 60 and extends from one spout 63 to the other spout 63. The female zipper member 68 is positioned just inside the mouth 62 and protrudes from the other interior side of the tumbler 60 and extends from one spout 63 to the other spout 63.

Figure 6A:
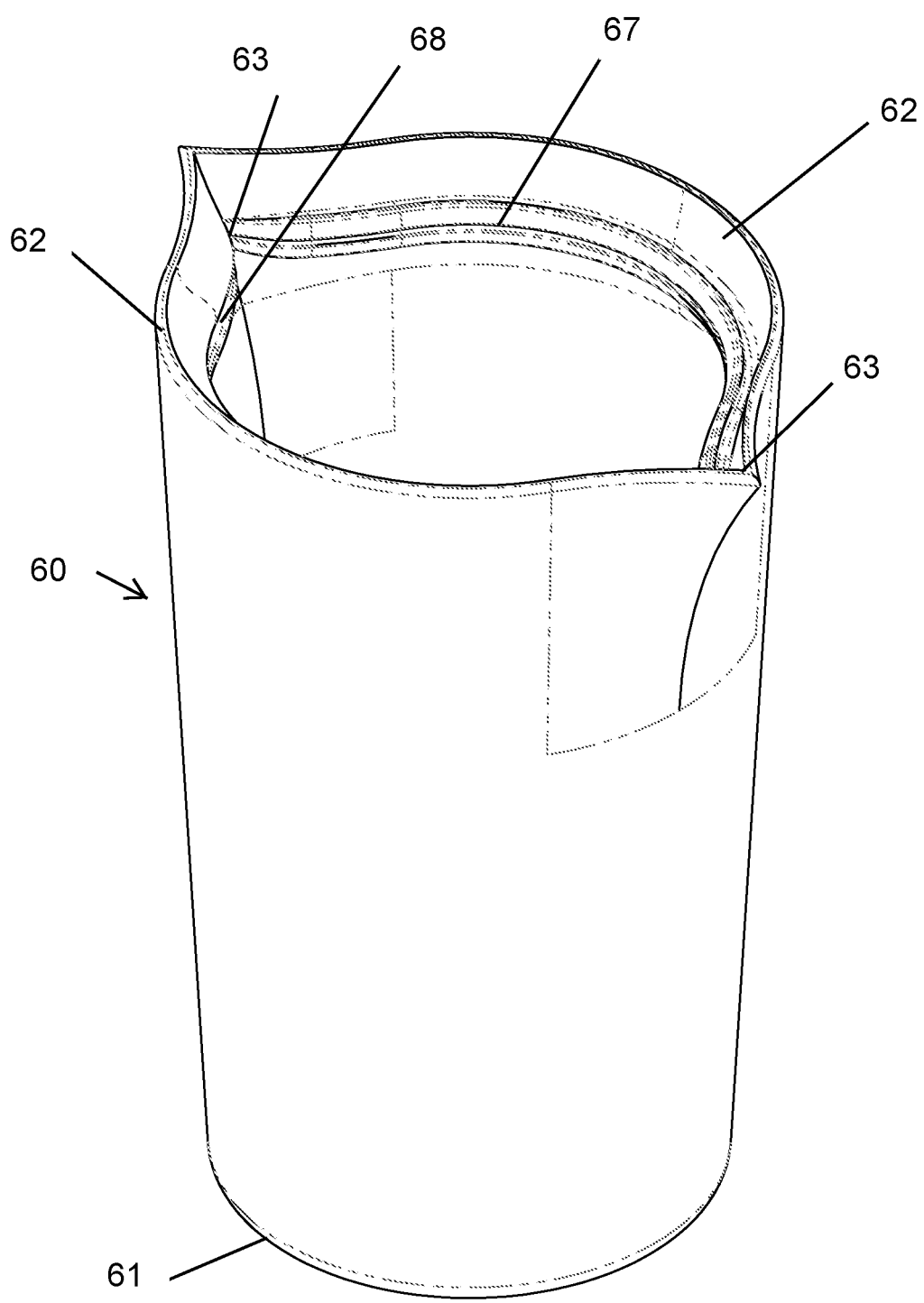
FIG. 6A is a perspective view of a tumbler having a spout at each end of the mouth.

FIG. 6A is a perspective view of the tumbler 60. FIG. 6B is a top view of the tumbler 60 with indicated cross-sections, wherein sections C-C, D-D and E-E are shown in FIGS. 6C-6E, respectively. Throughout a substantial portion of the middle of the male and female members 67 and 68, the members are fully formed and fully dimensioned. FIG. 6C shows the fully formed and fully dimensioned male and female members 67 and 68. In this embodiment, the members have interlocking features that hold them together and form a seal when the male zipper member 67 is inserted into the female zipper member 68. In cross-section, the male zipper member 67 has a button or mushroom profile having a trunk 101 with a head 102 at the distal end of the trunk 101. The head 102 is wider than the trunk 101 so that two shoulders 103 extend in opposite directions from the trunk 101. In cross-section, the female zipper member 68 comprises two opposed flanges 104, wherein each flange 104 has a shoulder 105 extending toward the opposite flange 104. When the male and female members 67 and 68 are engaged to close and seal the mouth 62, the head 102 is inserted between the flanges 104 until the shoulders 103 of the male zipper member 67 become locked behind shoulders 105 of the female zipper member 68. Because the male and female members 67 and 68 are made of a flexible material, the members flex during insertion and rebound upon engagement.

As the male and female members 67 and 68 extend toward the spouts 63, they become shorter in height but retain their form. FIG. 6D shows the relatively shorter male and female members 67 and 68. In particular, the size of the head 102 of the male zipper member 67 is the same size and the channel defined by the flanges 104 of the female zipper member 68 is the same size as the head and channel shown in FIG. 6C.

As the male and female members 67 and 68 extend nearly to the spouts 63, they become even shorter in height and change their form. In this embodiment, the members change their form by reducing the size of the head 102 and reducing the size of the channel between the flanges 104. FIG. 6E shows the relatively shorter male and female members 67 and 68. The shoulders 103 and 105 also shrink in size as the member tapers toward the spouts 63. The male and female members 67 and 68 continue to taper until they become non-existent at the spouts 63.

Figure 6F:
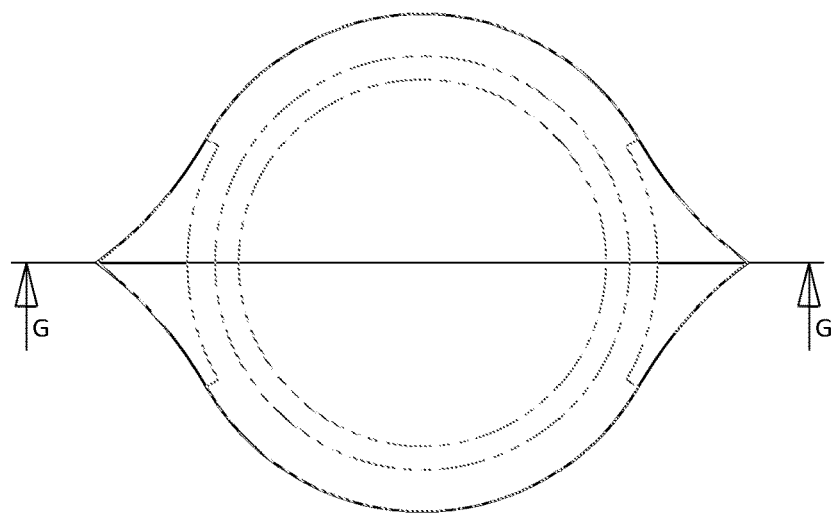
FIG. 6F shows a top view of the tumbler of FIG. 6A with a cross-section indicated.
Figure 6G:
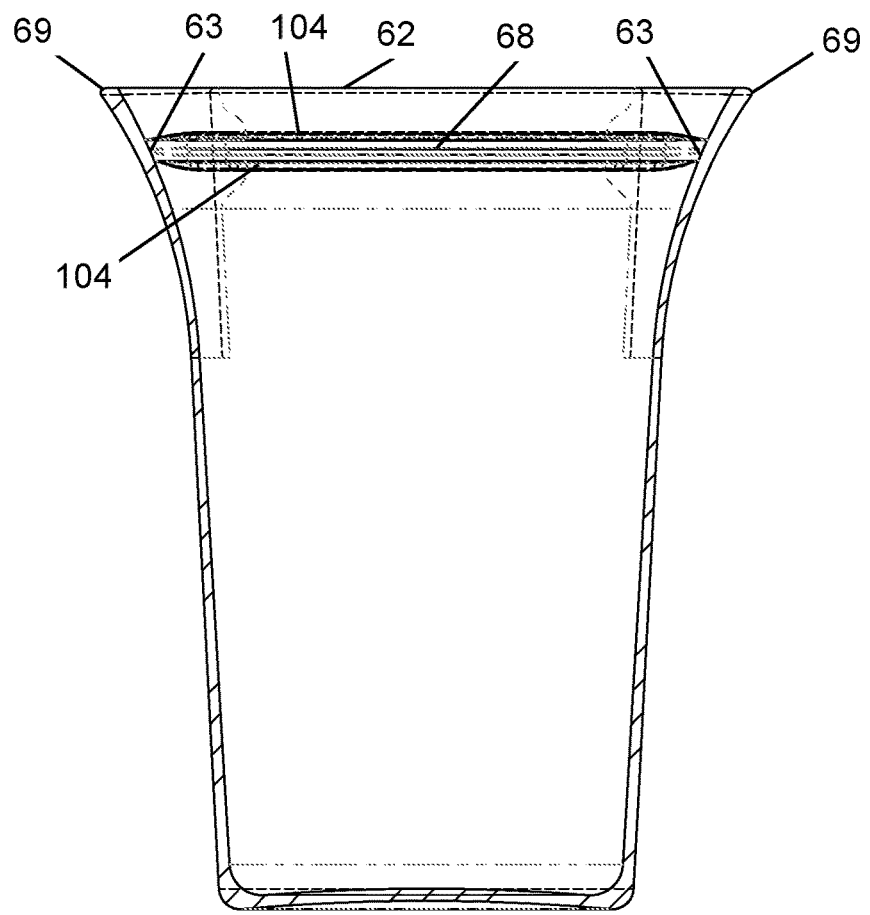
FIG. 6G is a cross-sectional front view of the tumbler of FIG. 6A showing how the zipper member terminates at the spouts.

FIG. 6F is a bottom view of the tumbler 60 shown in FIGS. 6A-6E, indicating a cut-away elevation G-G along the axis of the mouth 62. FIG. 6G is a cut-away front view of the tumbler 60, wherein the cut-away is at Section G-G so that the interior of the tumbler 60 is visible. The female zipper member 68 extends from one spout 63 to the other. The female zipper member 68 has two flanges 104, which define a channel between for receiving the head 102 of the male zipper member 67 (not shown). The flanges 104 taper and become smaller as they extend toward the spouts 63 so that they terminate at the spouts 63. Of course, the channel defined between the flanges 104 also terminates at the spouts 63.

Referring again to FIGS. 6A and 6B, the male and female zipper members 67 and 68 do not interfere with the spout 63. When the mouth 62 is open, the male and female zipper members 67 and 68 do not engage with each other at the spouts 63. This allows a fluid contained within the tumbler 60 to be poured out of either spout 63 without flowing over either of the male and female zipper members 67 and 68. Rather, the fluid may flow between the male and female zipper members 67 and 68 through either of the spouts 63. Further, because the zipper members do not engage when the mouth 62 is open, there is less opportunity for debris and residue to become lodged in the channel defined between the flanges 104 of the female zipper member 68 or behind the head 102 of the male zipper member 67.

FIGS. 7A-7D show perspective cross-sectional end views of an alternative tumbler 70. The tumbler 70 comprises a base 71 that is generally circular in shape. The tumbler 70 further comprises a mouth 72 at the top, wherein the mouth is generally circular when open and generally linear when closed. At each end of the interior of the mouth 72, the tumbler 70 has a spout 73. In this embodiment, the tips 79, formed at each end of the mouth 72, have wall thicknesses approximately the same as the side walls forming the mouth 72. The male zipper member 77 is positioned just inside the mouth 72 and protrudes from one interior side of the tumbler 70 and extends from one spout 73 to the other spout 73. The female zipper member 78 is positioned just inside the mouth 72 and protrudes from the other interior side of the tumbler 70 and extends from one spout 73 to the other spout 73. In this embodiment, the male and female zipper members 77 and 78 have end sections near the spouts 73 that are much different than the middle sections.

Figure 7A:
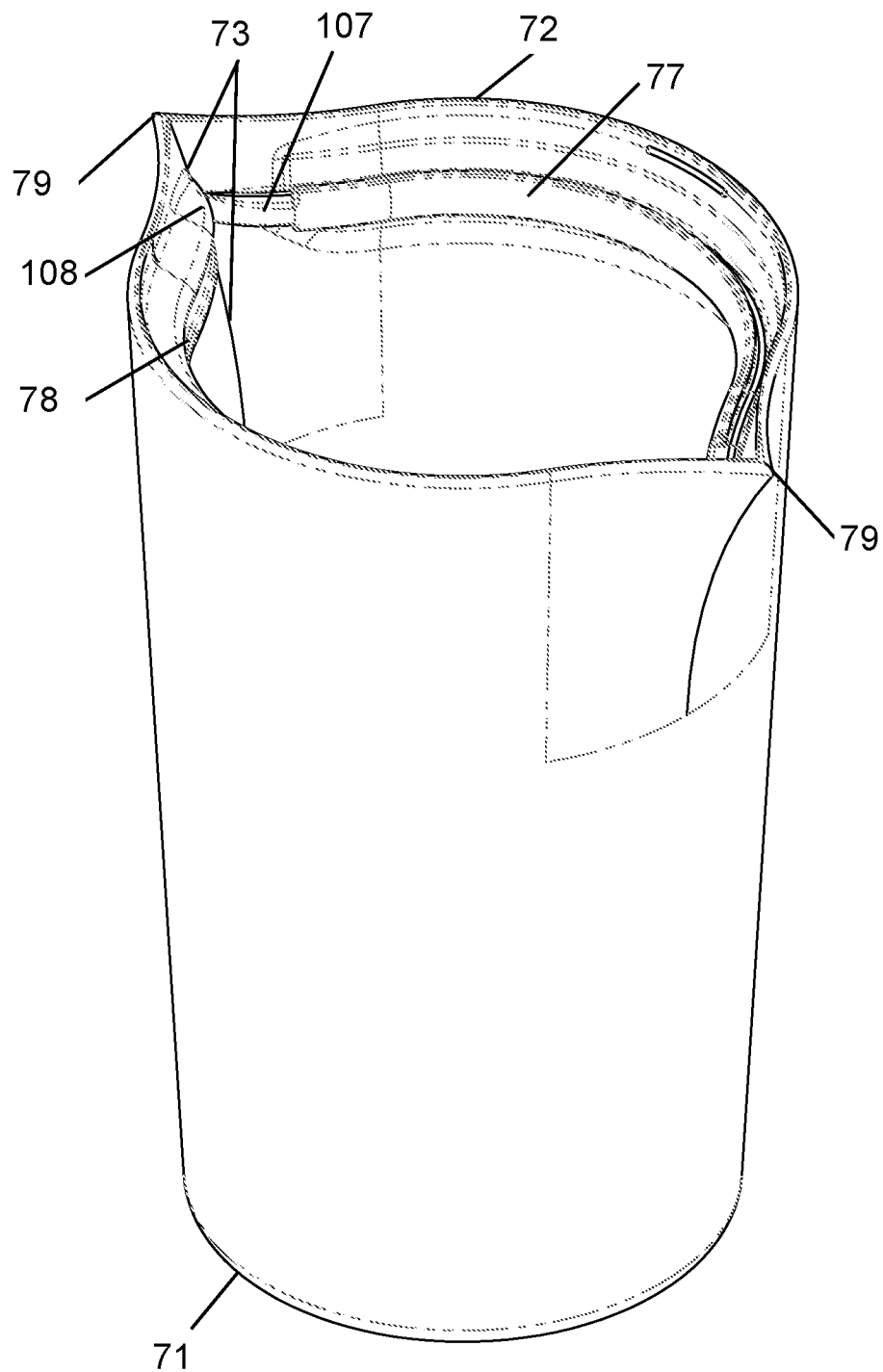
FIG. 7A is a perspective view of a tumbler having a spout at each end of the mouth and an alternative embodiment of the zipper members.

FIG. 7A is a perspective view of the tumbler 70. FIG. 7B is a top view of the tumbler 70 with indicated cross-sections, wherein sections C-C and D-D are shown in FIGS. 7C and 7D, respectively. FIG. 7C shows the male zipper member 77 has a button or mushroom profile having a trunk 101 with a head 102 at the distal end of the trunk 101. The head 102 is wider than the trunk 101 so that two shoulders 103 extend in opposite directions from the trunk 101. In cross-section, the female zipper member 78 comprises two opposed flanges 104, wherein each flange 104 has a shoulder 105 extending toward the opposite flange 104. When the male and female members 77 and 78 are engaged to close and seal the mouth 72, the head 102 is inserted between the flanges 104 until the shoulders 103 of the male zipper member 77 become locked behind shoulders 105 of the female zipper member 78. Both the male zipper member 77 and female zipper member 78 maintain their cross-sectional profiles throughout the entire middle sections. The ends of the male and female zipper members 77 and 78 have a different profile compared to the middle sections. The ends of the male zipper members 77 have a cross-sectional profile in the shape of a headless trunk 107. See FIG. 7D. The ends of the female zipper members 78 have a cross-sectional profile in the shape of two shoulderless flanges 108, which define a channel between the flanges. See FIG. 7D. Thus, a difference between the embodiment of FIGS. 6A-6F and the embodiment of FIGS. 7A-7D is that the shoulders 103 and 105 terminate well before the male and female zipper members 77 and 78 terminate at the spouts 73. However, a similar feature of the two embodiments is that the male and female zipper members 77 and 78 do not interfere with the spout 73. When the mouth 72 is open, the male and female zipper members 77 and 78 do not engage with each other at the spouts 73. This allows a fluid contained within the tumbler 70 to be poured out of either spout 73 without flowing over either of the male and female zipper members 77 and 78. Rather, the fluid may flow between the headless trunk 107 and the shoulderless flanges 108 through either of the spouts 73. Further, because the zipper members do not engage when the mouth 72 is open, there is less opportunity for debris and residue to become lodged in the channel defined between the shoulderless flanges 108 of the female zipper member 78 or around the headless trunk 107 of the male zipper member 77.

Although the disclosed embodiments are described in detail in the present disclosure, it should be understood that various changes, substitutions and alterations can be made to the embodiments without departing from their spirit and scope.

What is claimed is:

1. A container comprising:
a base and freestanding sides extending from the base to define a mouth opposite the base, wherein the base, the freestanding sides, and the mouth are a unitary whole container without assembled parts, the mouth comprising:
a first spout;
a second spout opposite the first spout;
a female zipper member extending from a first interior side of the mouth from the first spout to the second spout, the female zipper member comprising:
a female middle portion comprising:
two middle flanges extending from the first interior side of the mouth to define a middle channel between the two middle flanges, and
a distal female middle shoulder extending from each of the two middle flanges toward each other into the middle channel;
first and second female end portions opposite each other with the female middle portion between, each of the first and second female end portions comprising:
two end flanges extending from the first interior side of the mouth to define an end channel between the two end flanges,
wherein the two middle flanges extend farther from the first interior side of the mouth than the two end flanges;
a male zipper member extending from a second interior side of the mouth from the first spout to the second spout, wherein the female and male zipper members are positioned opposite each other so as to share the same central axis to be engageable when closing the mouth, the male zipper member comprising:
a male middle portion positioned opposite the channel of the female middle portion and comprising:
a middle trunk extending from the second interior side of the mouth, and
two distal male middle shoulders extending opposite each other from the middle trunk; and
first and second male end portions at opposite ends of the middle portion positioned opposite the end channels of the first and second female end portions, each of the first and second male end portions comprising:
an end trunk extending from the second interior side of the mouth,
wherein the middle trunk extends farther from the second interior side of the mouth than the end trunk;
wherein the male and female zipper members do not extend across either the first or second spout when the mouth is in an open configuration;
wherein each of the first and second female end portions further comprise a distal female end shoulder extending from each of the two end flanges toward each other into the end channel, and the distal female middle shoulders extend from the two middle flanges farther than the distal female end shoulders extend from the two end flanges; and
wherein the each of the first and second male end portions further comprise two distal male end shoulders extending opposite each other from the end trunk and the male middle shoulders extend farther from the middle trunk than the male end shoulders extend from the end trunk.

2. The container, as claimed in claim 1, wherein the base and sides have thicknesses greater than 0.5 mm.

3. The container, as claimed in claim 1, wherein the base and sides have thicknesses between 0.7 mm and 1.3 mm.

4. The container, as claimed in claim 1 wherein the thickness of each of the first and second zipper members is less than 5.0 mm.

5. The container, as claimed in claim 1, wherein the female middle portion tapers into both of the first and second female end portions, and wherein the male middle portion tapers into both of the first and second male end portions.

6. The container, as claimed in claim 1, wherein the base, freestanding sides, and mouth consist essentially of silicone.

7. The container, as claimed in claim 1, wherein the base and sides have thicknesses greater than 0.5 mm, and wherein the thickness of each of the male and female zipper members is less than 5.0 mm.

8. The container, as claimed in claim 1, wherein the mouth is biased toward the open configuration such that when the container stands freely on its base the mouth stays open when in the open configuration.

\* \* \* \* \*